(12) United States Patent
Kawahira et al.

(10) Patent No.: US 9,274,375 B2
(45) Date of Patent: Mar. 1, 2016

(54) LIQUID CRYSTAL DISPLAY PANEL AND LIQUID CRYSTAL DISPLAY DEVICE

(71) Applicant: Sharp Kabushiki Kaisha, Osaka (JP)

(72) Inventors: Yuichi Kawahira, Osaka (JP);
Toshihiro Matsumoto, Osaka (JP);
Mitsuhiro Murata, Osaka (JP); Yosuke Iwata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/382,753

(22) PCT Filed: Feb. 20, 2013

(86) PCT No.: PCT/JP2013/054209
§ 371 (c)(1),
(2) Date: Sep. 3, 2014

(87) PCT Pub. No.: WO2013/133022
PCT Pub. Date: Sep. 12, 2013

(65) Prior Publication Data
US 2015/0042922 A1 Feb. 12, 2015

(30) Foreign Application Priority Data
Mar. 8, 2012 (JP) .................................. 2012-052268

(51) Int. Cl.
*G02F 1/1335* (2006.01)
*G02F 1/13363* (2006.01)
*G02F 1/1343* (2006.01)
(Continued)

(52) U.S. Cl.
CPC .......... *G02F 1/13363* (2013.01); *G02F 1/0045* (2013.01); *G02F 1/1336* (2013.01); *G02F 1/1362* (2013.01); *G02F 1/1393* (2013.01); *G02F 1/13439* (2013.01); *G02F 1/133345* (2013.01); *G02F 1/133528* (2013.01); *G02F 1/133555* (2013.01); *G02F 1/134309* (2013.01); *G02F 1/134363* (2013.01);
(Continued)

(58) Field of Classification Search
CPC .............. G02F 1/13363; G02F 1/0045; G02F 1/133528; G02F 1/13439; G02F 1/1362; G02F 1/1336; G02F 1/133345; G02F 1/134309; G02F 1/134363; G02F 1/133555; G02F 2001/133541; G02F 2413/13
See application file for complete search history.

(56) References Cited

U.S. PATENT DOCUMENTS

2003/0071952 A1* 4/2003 Yoshida ................ G02F 1/1393
349/141
2007/0115417 A1* 5/2007 Ge .................... G02F 1/134363
349/141
(Continued)

FOREIGN PATENT DOCUMENTS

JP 2011-149967 A 8/2011

*Primary Examiner* — Donald Raleigh
(74) *Attorney, Agent, or Firm* — Chen Yoshimura LLP

(57) ABSTRACT

A liquid crystal display panel includes a metal electrode, a transparent electrode, an interlayer insulating film, and a comb-shaped electrode. Distorted horizontal electric fields are generated in order to distort the orientation of liquid crystal molecules. Accordingly, it is possible to achieve a transflective liquid crystal display device that has high transmittance, reflectance, and yield, and that can suppress display defects such as screen burn-in without using a panel gap adjusting structure, a driving method that respectively applies different electric fields to the reflective region and the transmissive region, or a multi-L/S structure.

12 Claims, 19 Drawing Sheets

(51) Int. Cl.
  *G02F 1/00* (2006.01)
  *G02F 1/1333* (2006.01)
  *G02F 1/1362* (2006.01)
  *G02F 1/139* (2006.01)
(52) U.S. Cl.
  CPC .............. *G02F 2001/133541* (2013.01); *G02F 2001/133638* (2013.01); *G02F 2413/13* (2013.01)

(56) References Cited

U.S. PATENT DOCUMENTS

2009/0073352 A1* 3/2009 Hamilton ............ G02F 1/13363 349/96
2009/0262286 A1* 10/2009 Nishida ............. G02F 1/133555 349/114
2011/0134348 A1 6/2011 Morishita et al.

* cited by examiner (a)

(b)

(a)
Δn·d ≈ 450nm (456nm)
T Region: L=4.0μm, S=12.0μm
R Region: L=4.0μm, S=12.0μm (b)

FIG. 13

|  | Configuration In FIG. 11 (Comparison Example 1) | Configuration In FIG. 12 (Present Embodiment) |
|---|---|---|
| Transmittance (Reflectance) at 5V | Approximately 4% | Approximately 10% |
| Screen Burn-in | × | ○ |

(a)

(b)

LIQUID CRYSTAL DISPLAY PANEL AND LIQUID CRYSTAL DISPLAY DEVICE

TECHNICAL FIELD

The present invention relates to a transflective liquid crystal display panel and a liquid crystal display device provided with this transflective liquid crystal display panel.

BACKGROUND ART

Liquid crystal display devices have become widely used in various fields in televisions, monitors, mobile phones, and the like. These devices offer characteristics such as energy saving, thinness, and being light-weight.

These types of liquid crystal display devices are categorized as transmissive, reflective, or transflective, depending on the light source used for display.

Transmissive liquid crystal display devices perform display by a liquid crystal display panel provided in a liquid crystal display device being illuminated with light from a backlight, which is provided separately. This allows for a bright, high-contrast display, but has high energy consumption.

On the other hand, reflective liquid crystal display devices do not use light from a backlight to perform display, but rather reflect ambient light through a reflective electrode disposed in the liquid crystal display panel. This does not require a backlight, and as such can suppress power consumption, but the contrast will drop depending on the ambient brightness where the reflective liquid crystal display device is used.

To improve on these issues with transmissive and reflective liquid crystal display devices, a transflective liquid crystal display device has been developed that has, in a single pixel of the liquid crystal display panel, a transmissive region for performing display with light from the backlight, and a reflective region that performs display with ambient light reflected by the reflective electrode.

In this type of transflective liquid crystal display device, the transmissive region performs display with light from the backlight when the ambient environment is dark, and thus is capable of maintaining a certain level of high contrast without relying on the surrounding brightness.

Furthermore, in this transflective liquid crystal display device, the reflective region performs display with the ambient light reflected by the reflective electrode, and the reflective region does not use light from the backlight, which makes it possible to achieve a reduction in power consumption.

A transflective liquid crystal display device having these characteristics is used indoors or outdoors and is actively adopted into mobile devices such as smartphones and mobile phones that have a limited power supply.

Transflective liquid crystal display devices, however, have problems as described below.

FIG. 18 is a schematic configuration of a conventional transflective liquid crystal display panel.

As shown in FIG. 18(a), a transflective liquid crystal display panel 100a includes an active matrix substrate, color filter substrate, and a liquid crystal layer 107 constituted of liquid crystal molecules 106 sandwiched between these two substrates.

The active matrix substrate has an insulating substrate 101 that allows visible light to pass therethrough, TFT devices (not shown) formed on the insulating substrate 101, an insulating layer (not shown), a reflective electrode 102 and a transparent electrode 103 as a pixel electrode connected to a drain electrode of the respective TFT devices, and an alignment film (not shown).

The color filter substrate has an insulating substrate 104 that allows visible light to pass therethrough, a transparent electrode 105 as a common electrode, and an alignment film (not shown).

As shown in FIG. 18(a), the reflective electrode 102, which is a portion of the pixel electrode, is disposed in the reflective region of the transflective liquid crystal display panel 100a, and the transparent electrode 103, which is another portion of the pixel electrode, is disposed in the transflective region.

Merely providing the reflective electrode 102 in the reflective region of the transflective liquid crystal display panel 100a and the transparent electrode 103 in the transparent region in this manner will cause the light in the reflective region and the transmissive region to be in different phases.

This phase difference is a value determined by the birefringence $\Delta n$ of the liquid crystal layer and the panel gap (thickness of liquid crystal layer) d.

The reason that a difference in the phases of light in the reflective region and transmissive region would occur is that, in general, the distance that light travels through the liquid crystal layer 107 in the reflective region is two times that of the transmissive region in the transflective liquid crystal display panel 100a having both the transmissive region and the transflective region.

In other words, the optical path is one-way in the transmissive region, but two-way in the reflective region.

Accordingly, in the transflective liquid crystal display panel, phase of light in the reflective region and the phase of light in the transmissive region need to be made the same in order to approximately equalize the optical characteristics of the transmissive region and the reflective region.

Liquid crystal display panels 100b and 100c that have had the optical characteristics of the transmissive region and the reflective region thereof approximately equalized in this manner are shown in FIGS. 18(b) and 18(c).

In the liquid crystal display panel 100b shown in FIG. 18(b), a multi-gap configuration is adopted in which a panel gap adjusting structure 108 is provided in the reflective region in order to make the phase of light in the reflective region the same as the phase of light in the transmissive region and to reduce the panel gap (thickness of the liquid crystal layer) d of the reflective region to one half of the panel gap (thickness of the liquid crystal layer) d in the transmissive region.

In this configuration, however, it is necessary to provide a structure with recesses and protrusions on the substrate, which can make the structure become complex and require more precision in the manufacturing process.

Meanwhile, the liquid crystal display panel 100c shown in FIG. 18(c) has an electrode structure in which different electric fields A and B can be respectively applied to the reflective region and the transmissive region in order to make the orientation state of the liquid crystal molecules 106 in the reflective region and transmissive region different from each other. The respective applying of the different electric fields A and B to the reflective region and the transmissive region is driven by a driving method.

In this structure, however, it is necessary to have this complicated driving method and electrode structure, which poses problems.

In the commonly used modes for liquid crystal display devices, such as VA mode, IPS mode, and FFS mode, due to the reasons described below it is necessary to use the panel gap adjusting structure 108 and the driving method to respectively apply the different electric fields to the reflective region and transmissive region described above in order to make the phase of light in the reflective region and the phase of light in the transmissive region the same, thereby approximately equalizing the optical characteristics of the transmissive region and the reflective region.

This is because in most VA modes, where the liquid crystal molecules are oriented perpendicular to the substrate surface when there is no applied voltage and then twisted when there is applied voltage in order to perform display, the orientation of the liquid crystal molecules when there is applied voltage is substantially uniform along the horizontal direction of the substrate due to a change in the orientation direction caused by a uniform electric field generated between the two substrates (horizontal flat plates). Therefore, there is not much change in the birefringence Δn of the liquid crystal layer along the horizontal direction of the substrate, and thus, in order to make the phase of light in the reflective region the same as the phase of light in the transmissive region, it is necessary to make the birefringence Δn of the liquid crystal layer in the reflective region and transmissive region different from each other by either adjusting the panel gap (thickness of the liquid crystal layer) d using the panel gap adjusting structure 108 or by respectively applying different electric fields to the reflective region and transmission region.

In most IPS mode or FFS mode liquid crystal display devices, which perform display by twisting the liquid crystal molecules on the substrate surface, the liquid crystal molecules are oriented horizontally to the substrate surface when there is no applied voltage; therefore, it is difficult to achieve a normally black mode liquid crystal display device even if the same circularly polarized light in the above mode is used for VA mode transflective liquid crystal display devices.

Accordingly, in IPS mode or FFS mode liquid crystal display devices, to obtain a normally black mode liquid crystal display device using circularly polarized light, it is necessary to use the panel gap adjusting structure 108 or the driving method that respectively applies different electric fields to the reflective region and the transmission region, as described above.

Therefore, in a VA mode, IPS mode, or FFS mode liquid crystal display device, the structure will become complicated if circularly polarized light is used to obtain the normally black mode liquid crystal display device.

There is also a proposal for a normally black mode transflective liquid crystal display device that uses a mode other than the VA mode, IPS mode, or FFS mode, and that makes the optical characteristics of the transmissive region and the reflective region approximately equal by making the phase of the light in the reflective region the same as the phase of the light in the transmissive region without using the panel gap adjusting structure 108 or the driving method that respectively applies different electric fields to the reflective region and the transmissive region.

Patent Document 1 discloses a configuration in which the phase of light passing through the reflective region and the phase of light passing through the transmissive region are made uniform by using a comb-shaped electrode and a TBA mode (transverse bend alignment mode) that performs display by liquid crystal molecules that are perpendicular in an OFF state when there is no applied voltage being oriented to the horizontal direction in a vent shape by using a horizontal electric field in an ON state when there is applied voltage.

RELATED ART DOCUMENT

Patent Document

Patent Document 1: Japanese Patent Application Laid-Open Publication, "Japanese Patent Application Laid-Open Publication No. 2011-149967 (Published on Aug. 4, 2011)"

SUMMARY OF THE INVENTION

Problems to be Solved by the Invention

FIG. 19 is a schematic configuration of a TBA mode transflective liquid crystal display panel 200 provided with an active matrix substrate 210, an opposite substrate 250, and a liquid crystal layer 230 sandwiched between these two substrates, as disclosed in Patent Document 1.

As shown in FIG. 19, on the side of the active matrix substrate 210 in contact with the liquid crystal layer 230, the following is stacked in this order on an insulating substrate 211: a reflective layer 228 only disposed on a reflective region R, among a transmissive region T and the reflective region R; an interlayer insulating film 223; a gate bus line 212 and a Cs bus line 213; a gate insulating film 214; a semiconductor film 215; a source wiring line 217; a drain wiring line 218 and a source bus line 216; a contact hole 227 formed in the interlayer insulating film 223 and a planarizing film 224; comb-shaped common electrodes 221 and 229; a branch part 229c of the comb-shaped common electrode and branched parts 220b and 220c of a comb-shaped pixel electrode; and a vertical alignment film 225.

The portions of the Cs bus line 213, the gate insulating film 214, and the drain wiring line 218 that overlap form a storage capacitance part 222.

A polarizing plate 242 is disposed on the side of the insulating substrate 211 opposite to the side in contact with the liquid crystal layer 230.

A vertical alignment film 255 is disposed on a side of the opposite substrate 250 on an insulating substrate 251 that faces the side in contact with the liquid crystal layer 230, and a polarizing plate 241 is disposed on a side of the insulating substrate 251 opposite to the side facing the liquid crystal layer 230.

FIG. 20 shows results of using the structure of the TBA mode transflective liquid crystal display panel 200 shown in FIG. 19 to calculate orientation of an electric field generated when voltage is applied and the orientation of the liquid crystal molecules 231 during this time, as calculated by an LCD Master made by Syntech with the configuration shown in FIG. 20(a).

FIG. 20(b) shows the orientation of the electric field generated when 10V is applied, and FIG. 20(c) shows the orientation of the liquid crystal molecules 231 when 10V is applied.

As shown in FIG. 20, normally in the TBA mode the birefringence Δn spatial distribution occurs in the liquid crystal layer 230 in the X axis direction shown in FIG. 20(a), but as is understood by the electric field shown in FIG. 20(b), there are relatively few regions where the electric field is distorted, and as shown in FIG. 20(c), the orientation of the liquid crystal molecules 231 is horizontal following this electric field with small distortions.

In this case, even if the panel gap d, an electrode width L, and an electrode gap S are suitably configured in both the transmissive region T and the reflective region R, the variation curve of transmittance corresponding to the applied voltage in the transmissive region T differs greatly from the variation curve of reflectance corresponding to the applied voltage in the reflective region R.

Accordingly, in the TBA mode transflective liquid crystal display panel 200 shown in FIG. 19, the variation curve of transmittance corresponding to the applied voltage in the transmissive region T is made to approximate the variation curve of reflectance corresponding to the applied voltage in the reflective region R by differing the electrode gap S in the transmissive region T from the electrode gap S in the reflective region R, or in other words, by adopting a multi-L/S structure.

FIG. 21 shows the electrode gap S in the transmissive region T and the electrode gap S in the reflective region R in the TBA mode transflective liquid crystal display panel 200 shown in FIG. 19.

As shown in FIG. 21, in the TBA mode transflective liquid crystal display panel 200 shown in FIG. 19, the electrode gap S in the transmissive region T is narrower than the electrode gap S in the reflective region R.

As described above, in the TBA mode transflective liquid crystal display panel 200 disclosed in Patent Document 1, it is not necessary to have a panel gap adjusting structure or a driving method that respectively applies different electric fields to the reflective region and transmissive region, but it is necessary to ensure that the comb-shaped electrode gap in the transmissive region T is different from the comb-shaped electrode gap in the reflective region R. Due to this, there is a risk that yield in manufacturing could fall because of the difficulty of processing the comb-shaped electrode gaps.

Furthermore, in the TBA mode transflective liquid crystal display panel 200 disclosed in Patent Document 1, both the common electrode and the pixel electrodes must be formed in the comb shape, and thus these comb-shaped electrodes cannot double as a reflective plate, which means that it is necessary to separately form a metallic reflective layer 228 on the reflective region R.

Accordingly, in this type of configuration, there is a high possibility that charge would accumulate in the reflective layer 228 and cause display defects such as screen burn-in. The reflective layer 228 is not connected to any of the electrodes, and thus charge that becomes stored there for any reason cannot escape.

In the TBA mode transflective liquid crystal display panel 200 using the multi-L/S structure disclosed in Patent Document 1, there is a problem of low transmittance and reflectance as shown in FIG. 11, which is described in detail later.

The present invention was made in view of the above-mentioned problems, and aims at providing a transflective liquid crystal display panel that has high transmittance, reflectance, and yield, and that can suppress the occurrence of display defects such as screen burn-in without using a panel gap adjusting structure, a driving method that respectively applies different electric fields to a reflective region and transmissive region, or a multi-L/S structure. The present invention also aims at providing a liquid crystal display device provided with this type of transflective liquid crystal display panel.

Means for Solving the Problems

In order to solve the above-mentioned problems, a liquid crystal panel of the present invention includes: a liquid crystal display panel having a plurality of pixels that performs display by light reflection and light transmission at each of the plurality of pixels, the liquid crystal display panel having: a first substrate; a second substrate; a liquid crystal layer having liquid crystal molecules sandwiched between the first substrate and the second substrate, the liquid crystal molecules having a positive birefringence and, when no voltage is applied, being oriented perpendicularly to respective surfaces of the first substrate and the second substrate in contact with the liquid crystal layer; circularly polarizing members respectively disposed on the first substrate and the second substrate; a first electrode formed in a planar shape on the first substrate at each of the plurality of pixels, an insulating film formed on the first electrode; and a second electrode having a plurality of linear electrodes that are formed at constant intervals and constant line widths on the insulating film so as to overlap the first electrode in a plan view at each of the plurality of pixels.

With this configuration, the present invention has an electrode structure including, on the first substrate at the plurality of pixels, a planar first electrode, an insulating film formed on the first electrode, and a second electrode having a plurality of linear electrodes formed at constant intervals and constant widths on the insulating substrate so as to overlap the first electrode in a plan view; therefore, a horizontal electric field (fringe field) generated from this type of electrode structure can be used to intentionally make the alignment of the liquid crystal molecules in the liquid crystal layer when voltage is applied un-uniform along the horizontal direction of the first substrate and the second substrate.

In other words, by providing a spatial distribution in the orientation of the liquid crystal molecules in the liquid crystal layer, a distribution is formed with high transmittance portions and high reflectance portions, which makes it possible for transmittance to approximate reflectance in terms of space averaging when a prescribed voltage is applied.

The first electrode is formed in a planar shape, which makes it possible for the first electrode to double as a reflective plate; thus, this structure is not susceptible to charge building up on the first electrode.

Accordingly, with this configuration, it is possible to achieve a transflective liquid crystal display panel that has high transmittance, reflectance, and yield, and that can suppress display defects such as screen-burn in without using a panel gap adjusting structure, driving method that respectively applies different electric fields to the reflective region and the transmissive region, or a multi-L/S structure.

To solve the above-mentioned problems, a liquid crystal display device of the present invention includes the liquid crystal display panel described above, and a backlight.

With this configuration, it is possible to achieve a transflective liquid crystal display device that has high transmittance, reflectance, and yield, and that can suppress display defects such as screen burn-in without using a panel gap adjusting structure, driving method that respectively applies different electric fields to the reflective region and the transmissive region, or a multi-L/S structure.

Effects of the Invention

As described above, the liquid crystal display panel of the present invention having a plurality of pixels that performs display by light reflection and light transmission at each of the plurality of pixels includes: a first substrate; a second substrate; a liquid crystal layer having liquid crystal molecules sandwiched between the first substrate and the second substrate, the liquid crystal molecules having a positive birefringence and, when no voltage is applied, being oriented perpendicularly to respective surfaces of the first substrate and the second substrate in contact with the liquid crystal layer; circularly polarizing members respectively disposed on the first substrate and the second substrate; a first electrode formed in a planar shape on the first substrate at each of the plurality of pixels, an insulating film formed on the first electrode; and a second electrode having a plurality of linear electrodes that are formed at constant intervals and constant line widths on the insulating film so as to overlap the first electrode in a plan view.

The liquid crystal display device of the present invention includes the liquid crystal display panel and the backlight as described above.

Thus, it is possible to realize a transflective liquid crystal display panel that has high transmittance, reflectance, and yield, and that can suppress the occurrence of display defects such as screen burn-in without using a panel gap adjusting structure, a driving method that respectively applies different electric fields to a reflective region and transmissive region, or a multi-L/S structure. It is also possible to realize a liquid crystal display device provided with this type of transflective liquid crystal display panel.

BRIEF DESCRIPTION OF THE DRAWINGS

FIG. 13 shows results comparing the degree of transmittance (reflectance) and screen burn-in while applying 5V in the liquid crystal display panel of one embodiment of the present invention and Comparison Example 1.

DETAILED DESCRIPTION OF EMBODIMENTS

Below, embodiments of the present invention will be explained in detail with reference to figures. However, dimensions, materials, shapes, positional relationships, and the like of constituting members described in these embodiments are merely individual embodiment examples, and the scope of the present invention shall not be narrowly interpreted by being limited thereto.

Embodiment 1

Embodiment 1 of the present invention will be described below with reference to FIGS. 1 to 15.

Figure 1:
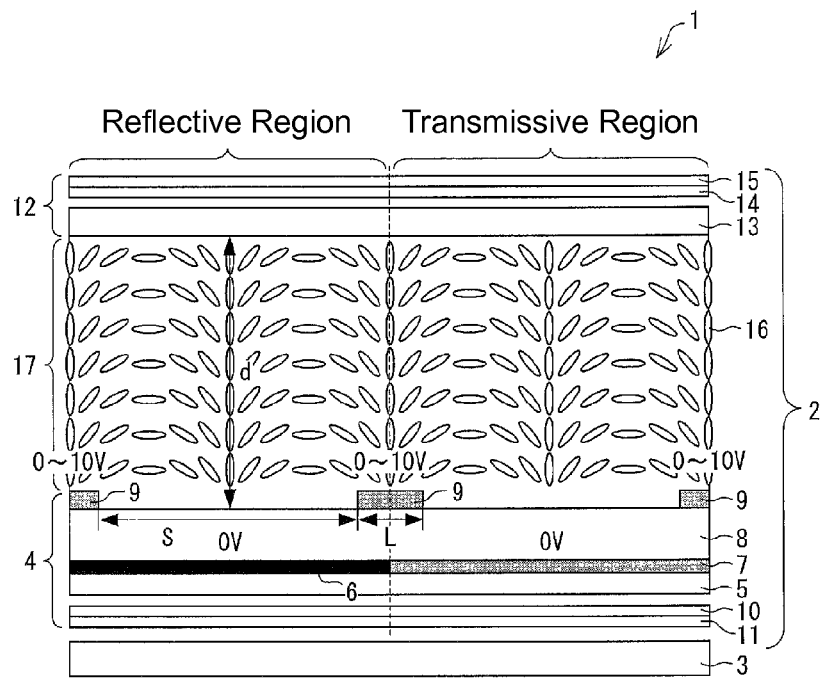
FIG. 1 is a schematic configuration of a liquid crystal display device provided with a transflective liquid crystal display panel according to one embodiment of the present invention.

FIG. 1 is a schematic configuration of a liquid crystal display device 1 provided with a transflective liquid crystal display panel 2.

As shown in FIG. 1, the liquid crystal display device 1 has a transflective liquid crystal display panel 2, and a backlight 3 that emits uniform light from the side opposite to the display surface of the transflective liquid crystal display panel 2.

The transflective liquid crystal display panel 2 includes an active matrix substrate 4, an opposite substrate 12, and a liquid crystal layer 17 having liquid crystal molecules 16 sandwiched between these two substrates.

FIG. 1 shows one pixel in the liquid crystal display device 1, and in the present embodiment each pixel having a single reflective region and a single transmissive region is described as an example, but the present invention is not limited to this, and each pixel may have a plurality of reflective regions and a plurality of transmissive regions.

On the side of an insulating substrate 5 provided on the active matrix substrate 4 in contact with a liquid crystal layer 17, a metal electrode 6 is formed in a planar shape in the reflective region and a transparent electrode 7 is formed in a planar shape in the transmissive region.

An interlayer insulating film 8 is formed to cover the metal electrode 6 and the transparent electrode 7.

Although not shown, TFT devices and wiring lines for driving these TFT devices are disposed on the active matrix substrate 4, and comb-shaped electrodes 9 having a base part and branch parts are electrically connected to the drain electrode of the respective TFTs.

The comb-shaped electrodes 9 have a plurality of linear electrodes, which are the branch parts, and these branch parts are shown in FIG. 1.

As shown in FIG. 1, the respective linear electrodes that are the branch parts of the comb-shaped electrodes 9 are formed to have a uniform line width L and a uniform gap S.

A voltage corresponding to image signals externally inputted for the respective pixels is applied to the comb-shaped electrodes 9.

Although not shown, when no current is being applied, the liquid crystal molecules 16 in the liquid crystal layer 17 are vertically aligned with respect to the active matrix substrate 4 and the opposite substrate 12 so as to overlap the comb-shaped electrodes 9 and the interlayer insulating film 8; thus, a vertical alignment film is provided.

A λ/4 plate 10 and a linear polarizing plate 11 are stacked in this order on a surface of the insulating substrate 5 provided on the active matrix substrate 4 opposite to the side in contact with the liquid crystal layer 17.

Although not shown, a color filter layer and a vertical alignment film are disposed on a surface of the insulating substrate 13 provided on the opposite substrate 12 in contact with the liquid crystal layer 17.

A λ/4 plate 14 and a linear polarizing plate 15 are stacked in this order on a surface of the insulating substrate 13 provided on the a side of the opposite substrate 12 that is opposite to the side in contact with the liquid crystal layer 17.

In the present embodiment, the color filter layer is described as being on the opposite substrate 12, but without being limited thereto, the transflective liquid crystal display panel 2 may a COA (color filter on array) structure in which the color filter layer is disposed on the active matrix substrate 4 side.

Figure 2:
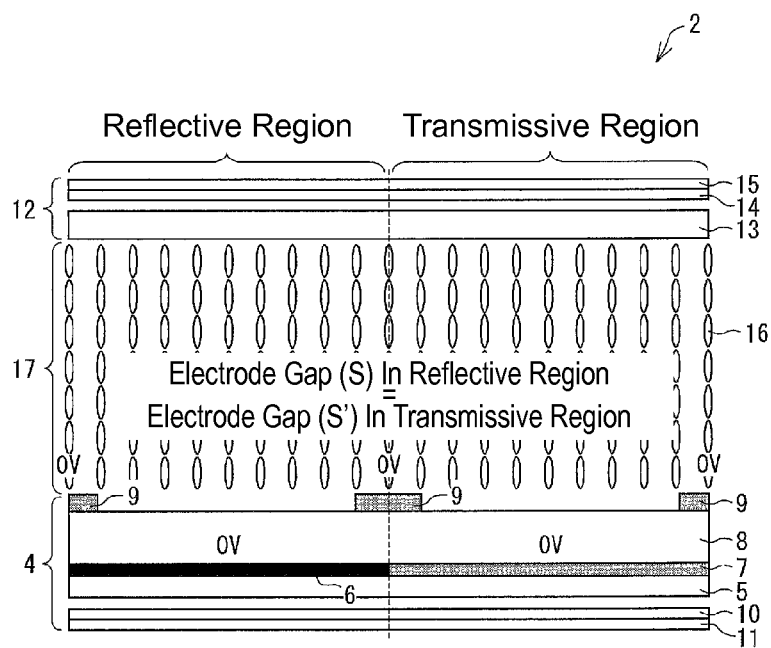
FIG. 2 is an orientation state of liquid crystal molecules when no voltage is being applied to the transflective liquid crystal display panel according to one embodiment of the present invention.

FIG. 2 shows an orientation state of the liquid crystal molecules 16 when no voltage is being applied in the transflective liquid crystal display panel 2.

As shown in FIG. 2, the liquid crystal molecules 16 in the liquid crystal layer 17 are aligned vertically with respect to the active matrix substrate 4 and the opposite substrate 12 when no voltage is being applied.

Figure 3:
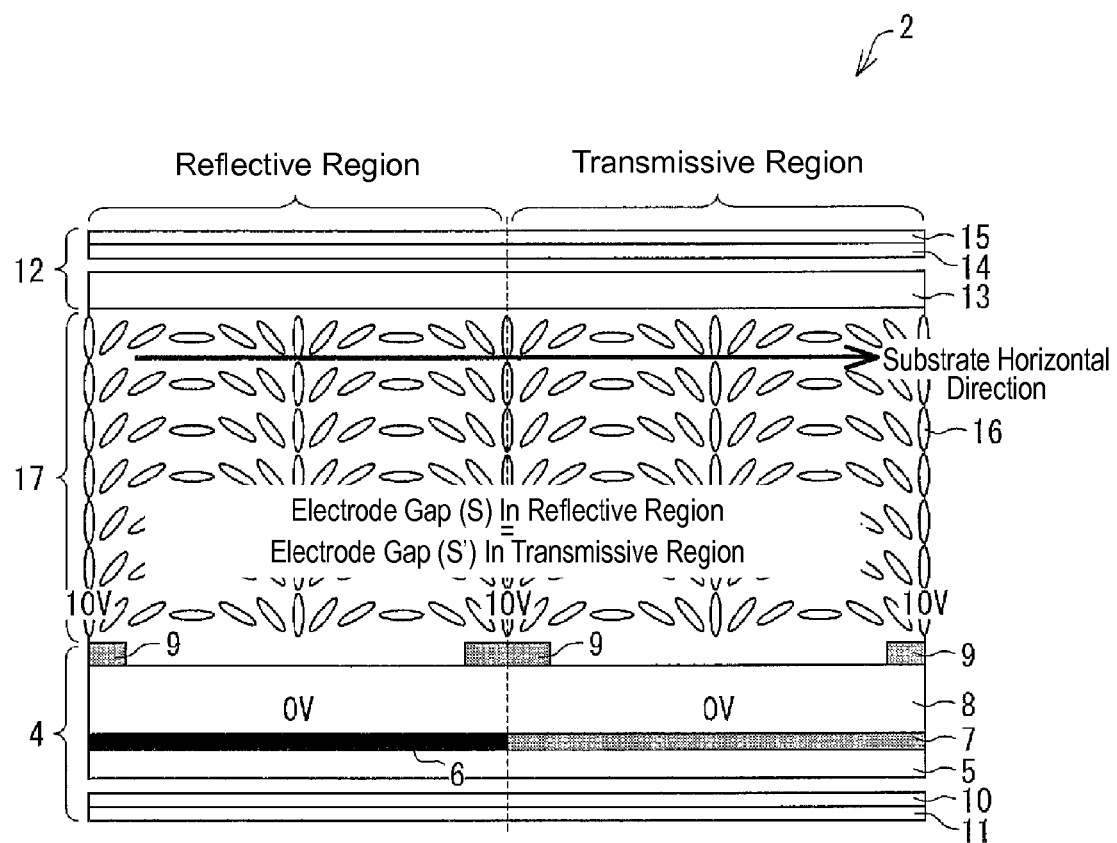
FIG. 3 is an orientation state of liquid crystal molecules when voltage is being applied to the transflective liquid crystal display panel according to one embodiment of the present invention.

FIG. 3 shows an orientation state of the liquid crystal molecules 16 when voltage is being applied in the transflective liquid crystal display panel 2.

As shown in FIG. 3, the active matrix substrate 4 has an electrode structure provided with the metal electrode 6 and the transparent electrode 7 formed in a planar shape, the interlayer insulating film 8 formed on the metal electrode 6 and the transparent electrode 7, and the comb-shaped electrodes 9 that have a plurality of linear electrodes formed with uniform gaps and uniform line widths on the interlayer insulating film 8 so as to overlap the metal electrode 6 and the transparent electrode 7 in a plan view; therefore, it is possible to use the horizontal electric field (fringe field) generated from this type of electrode structure to make the orientation of the liquid crystal molecules 16 in the liquid crystal layer 17 un-uniform along the horizontal direction (substrate horizontal direction) of the active matrix substrate 4 and the opposite substrate 12 when voltage (electric field) is being applied.

In other words, by providing a spatial distribution in the orientation of the liquid crystal molecules 16 in the liquid crystal layer 17, a distribution is formed with high transmittance portions and high reflectance portions, which makes it possible for transmittance to approximate reflectance in terms of space averaging when a prescribed voltage is applied.

The metal electrode 6 is formed in a planar shape and can double as a reflective plate. Thus, this provides a structure in which it is harder for charge to accumulate.

Accordingly, with the configuration of the transflective liquid crystal display panel 2 of the present embodiment, it is possible to realize the transflective liquid crystal display panel 2 that has high transmittance, reflectance, and yield, and that can suppress the occurrence of display defects such as screen burn-in without using a panel gap adjusting structure, a driving method that respectively applies different electric fields to a reflective region and transmissive region, or a multi-L/S structure.

By providing this type of transflective liquid crystal display panel 2 and backlight 3, it is possible to realize a transflective liquid crystal display device 1 that has high transmittance, reflectance, and yield, and that can suppress the occurrence of display defects such as screen burn-in without using a panel gap adjusting structure, a driving method that respectively applies different electric fields to a reflective region and transmissive region, or a multi-L/S structure.

In the present embodiment, a glass substrate was used for the insulating substrate 5 on the active matrix substrate 4 and the insulating substrate 13 on the opposite substrate 12, but there are no specific limitations as long as the substrate allows visible light to pass therethough and can withstand the processing temperatures of the film formed on the insulating substrates 5 and 13.

In the present embodiment, the metal electrode 6 was formed using Al having high conductivity and at least high reflectance of visible light, but without being limited thereto, Ag, Au, or the like may be used to form the metal electrode, for example.

In the present embodiment, the metal electrode 6 is formed with a single Al layer, but a multilayer film of a plurality of films can be used, in which the uppermost layer is Al, Ag, Au, or the like.

In the present embodiment, the transparent electrode 7 is formed using ITO (indium tin oxide) having conductivity and at least transmittance of visible light, but without being limited thereto, but IZO (indium zinc oxide) or the like may be used, for example.

In the present embodiment, an acrylic-based interlayer insulating film with a permittivity of 6.9 and formed at a film thickness of 1.0 μm is used for the interlayer insulating film 8, but without being limited thereto, an inorganic insulating film, a hybrid insulating film that has organic elements and inorganic elements, a configuration of these insulating films stacked together, or the like can also be used instead of the organic insulating film described above by adjusting the film thickness as appropriate depending on the permittivity of the insulating film.

In the present embodiment, the comb-shaped electrodes 9 were formed using ITO that are conductive and have transmittance of at least visible light, in a manner similar to the transparent electrode 7, but without being limited thereto, IZO or the like may be used, for example.

The respective linear electrodes, which are the branch parts of the comb-shaped electrodes 9, were formed with a line width L of 4.0 μm and a gap S between adjacent linear electrodes of 8.0 μm to 16.0 μm.

The circularly polarizing light member provided in the transflective liquid crystal display panel 2 will be explained below based on FIG. 4.

Figure 4:
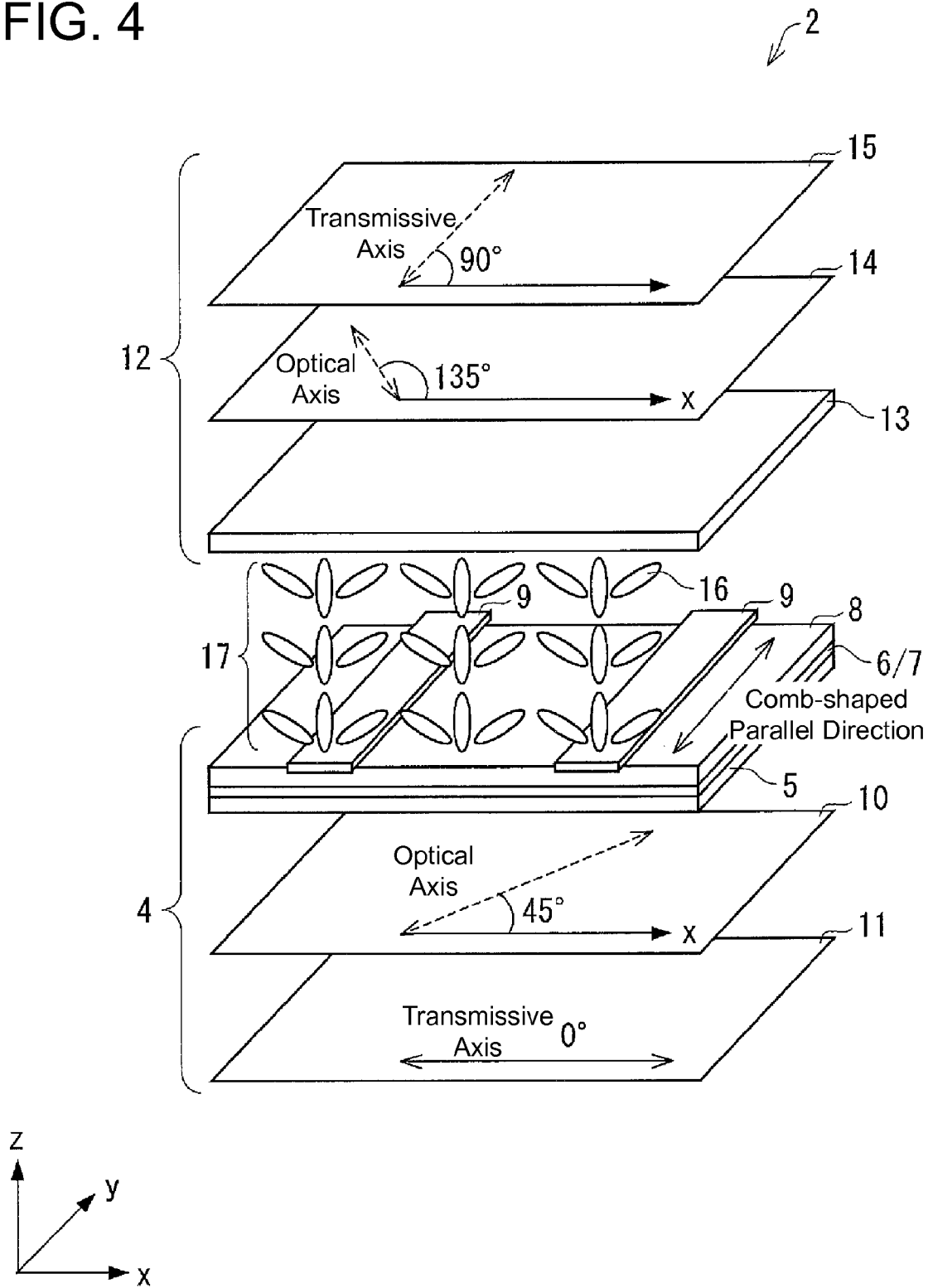
FIG. 4 shows the positional relationship between the optical axis of a λ/4 plate as a circularly polarizing light member and transmission axis of a linear polarizing plate provided on a transflective liquid crystal display panel according to one embodiment of the present invention.

FIG. 4 shows the positional relationship between the optical axes of the λ/4 plates 10 and 14, which are the circularly polarizing light members provided on the transflective liquid crystal display panel 2, and the transmission axes of the linear polarizing plates 11 and 15.

FIG. 4 shows how the optical axes of the λ/4 plates 10 and 14 as the circularly polarizing light members and the transmission axes of the linear polarizing plates 11 and 15 are arranged, and also shows these and the direction (comb parallel direction) in which the respective linear electrodes that are the branch parts of the comb-shaped electrodes 9 extend are arranged.

As shown in FIG. 4, the optical axis of the λ/4 plate 10 disposed on the active matrix substrate 4 forms a 45° angle to the transmission axis of the linear polarizing plate 11, and the optical axis of the λ/4 plate 14 disposed on the opposite substrate 12 also forms a 45° degree to the transmission axis of the linear polarizing plate 15.

The transmission axis of the linear polarizing plate 11 disposed on the active matrix substrate 4 is rotated 90° with respect to the transmission axis of the linear polarizing plate 15 disposed on the opposite substrate 12.

The optical axis of the λ/4 plate 10 disposed on the active matrix substrate 4 is also rotated 90° with respect to the optical axis of the λ/4 plate 14 disposed on the opposite substrate 12.

There are no particular limitations to the direction (comb parallel direction) in which the respective linear electrodes that are the branch parts of the comb-shaped electrodes 9 extend, as long as the respective relationships between the optical axes of the λ/4 plates 10 and 14 that are the circularly polarizing light members and the transmission axes of the linear polarizing plates 11 and 15 disposed on the transflective liquid crystal display panel 2 meet the conditions described above.

In the liquid crystal display panel 2 of the present embodiment, in order to achieve with ease a normally black mode display with the transmissive region and the reflective region, the optical axes of the λ/4 plates 10 and 14 that are the circularly polarizing light members and the transmission axes of the linear polarizing plates 11 and 15 are arranged to fulfill the above-mentioned relationships such that the orientation of the liquid crystal molecules 16 in the liquid crystal layer 17 are perpendicular to the active matrix substrate 4 and the opposite substrate 12 when no voltage (electric field) is applied and such that the light that enters this liquid crystal layer 17 becomes circularly polarized.

The liquid crystal layer 17, which includes the liquid crystal molecules 16 in the present embodiment, has a positive dielectric anisotropy ($\Delta n=0.12$, $\Delta\epsilon=20$) and a panel gap (thickness of the liquid crystal layer 17) of 3.4 μm to 4.2 μm.

Figure 5:
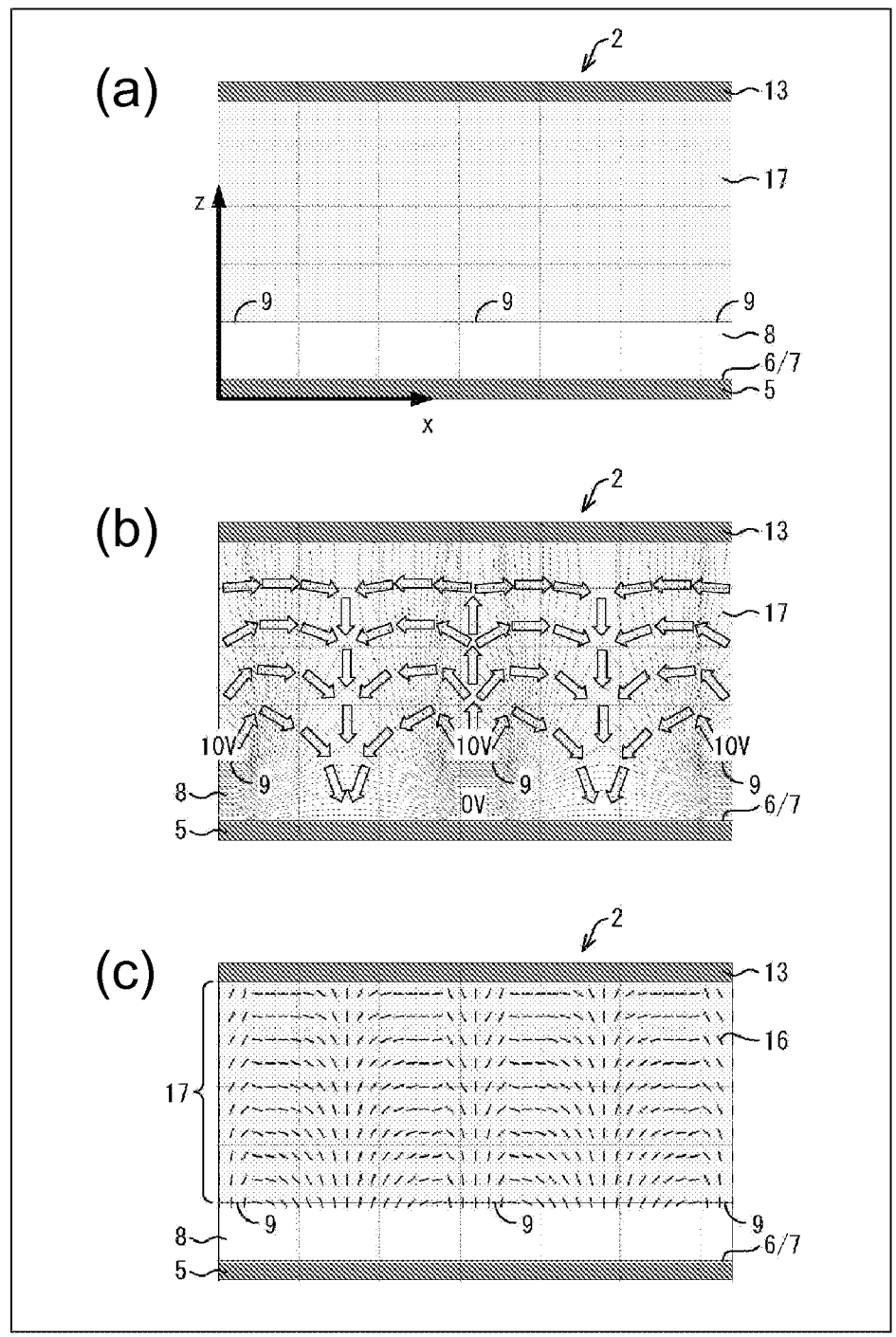
FIG. 5 shows how the optical characteristics (voltage-transmission/reflection characteristics) in the transmissive region and reflective region can approximate each other without needing a multi-gap structure or a multi-L/S structure in the transflective liquid crystal display panel according to one embodiment of the present invention.

FIG. 5 shows how the optical characteristics (voltage-transmission/reflection characteristics) in the transmissive region and reflective region can approximate each other without needing a multi-gap structure or a multi-L/S structure in the liquid crystal display panel 2 in the present embodiment.

In order for the optical characteristics (voltage-transmission/reflection characteristics) in the transmissive region and reflective region to approximate each other without needing the multi-gap structure or the multi-L/S structure, it is necessary for the liquid crystal molecules to not uniformly tilt along the substrate horizontal direction (the X axis direction in FIG. 5(a)) when voltage is applied to the comb-shaped electrodes 9.

If the liquid crystal molecules uniformly tilt along the X axis direction in FIG. 5(a) when voltage is applied to the comb-shaped electrodes 9, then $\Delta n$ of the liquid crystal layer will be approximately constant along the X axis direction.

On the other hand, as described above, the distance light travels through the reflective region is necessarily two times the distance that light travels through the transmissive region. Therefore, when $\Delta n$ is constant along the X axis direction, the difference between the phases of light traveling through both the transmissive region and the reflective region (a value proportional to the birefringence $\Delta n$ of the liquid crystal layer×the distance d traveled by the light) is not able to match any coordinate on the X axis; therefore, it is not possible to achieve optical characteristics (voltage-transmission/reflection characteristics) that are equal or approximate among the transmissive region and the reflective region.

In the liquid crystal display panel 2 of the present embodiment, as shown in FIG. 5(b), the electrode structure generates a horizontal electric field (fringe field), and as shown in FIG. 5(c), the orientation of the liquid crystal molecules 16 can be configured such that the tilt of the liquid crystal molecules 16 is non-uniform along the X axis. In other words, distortions in the electric field are used to generate distortions in the orientation of the liquid crystal molecules 16.

In this manner, $\Delta n$ of the liquid crystal layer 17 changes depending on the x-coordinates. Namely, it is possible to create a distribution in $\Delta n$ along the X axis.

At any particular x-coordinate, the transmittance and reflectance at a prescribed voltage cannot match each other, but the panel gap (thickness of the liquid crystal layer) d, the line width L of the respective linear electrodes that are the branch parts of the comb-shaped electrodes 9, and the gap S between the adjacent linear electrodes are configured such that a spatial distribution is generated in transmittance and reflectance in which transmittance becomes high in one region and reflectance becomes high in another region, or namely, that a spatial distribution in $\Delta n$ is generated, thereby making it possible for the average transmittance and the average reflectance for each prescribed region to equal or approximate each other.

These values can be configured to be shared among all regions, without distinction between transmissive regions and reflective regions, and therefore, it is not necessary to use a multi-gap structure or a multi-L/S structure.

Figure 20:
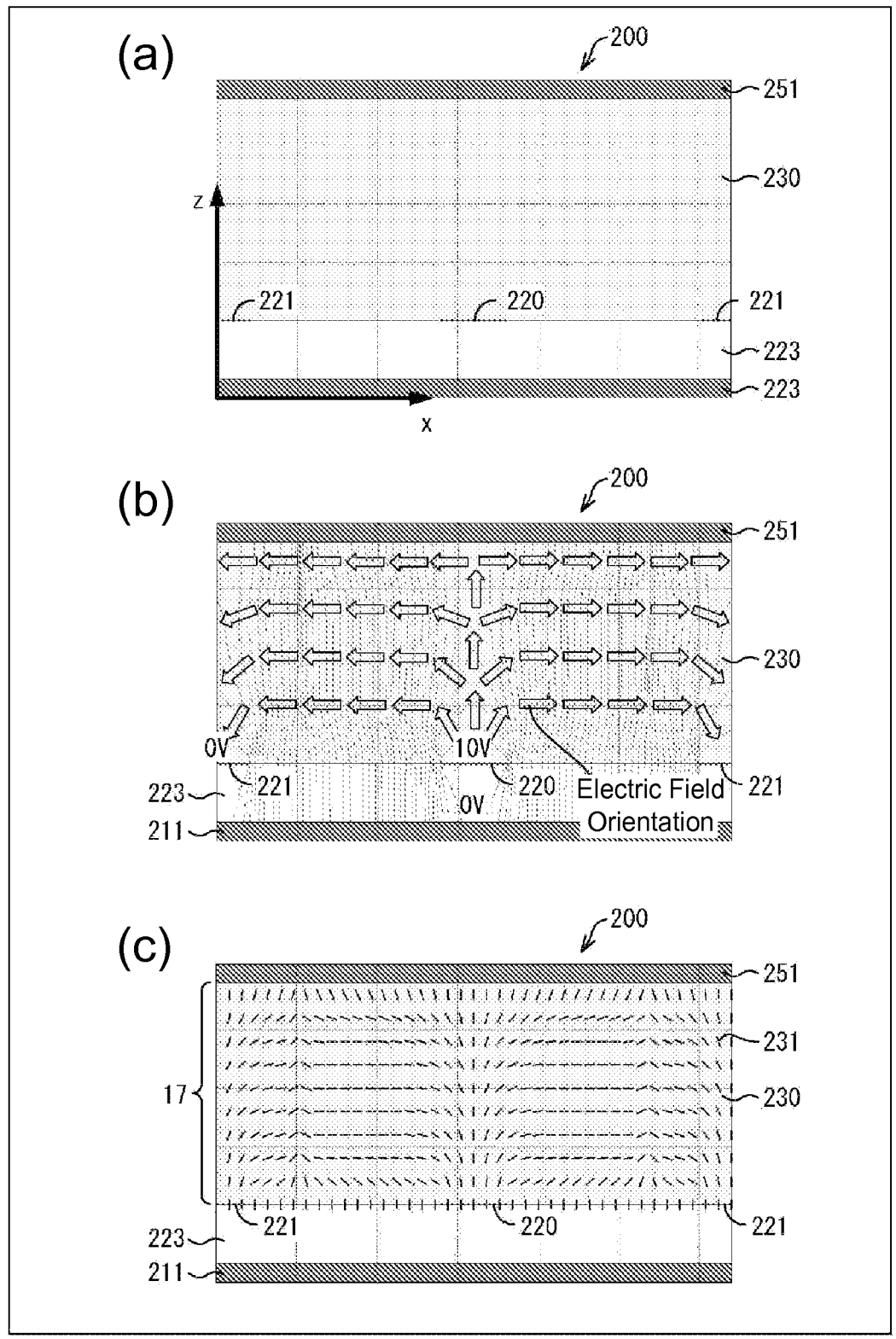
FIG. 20(a) is a view of a model structure of the TBA mode transflective liquid crystal display panel disclosed in Patent Document 1.
FIG. 20(b) shows an orientation of the electric field generated at 10V.
FIG. 20(c) shows orientation of the liquid crystal molecules at 10V.
Figure 21:
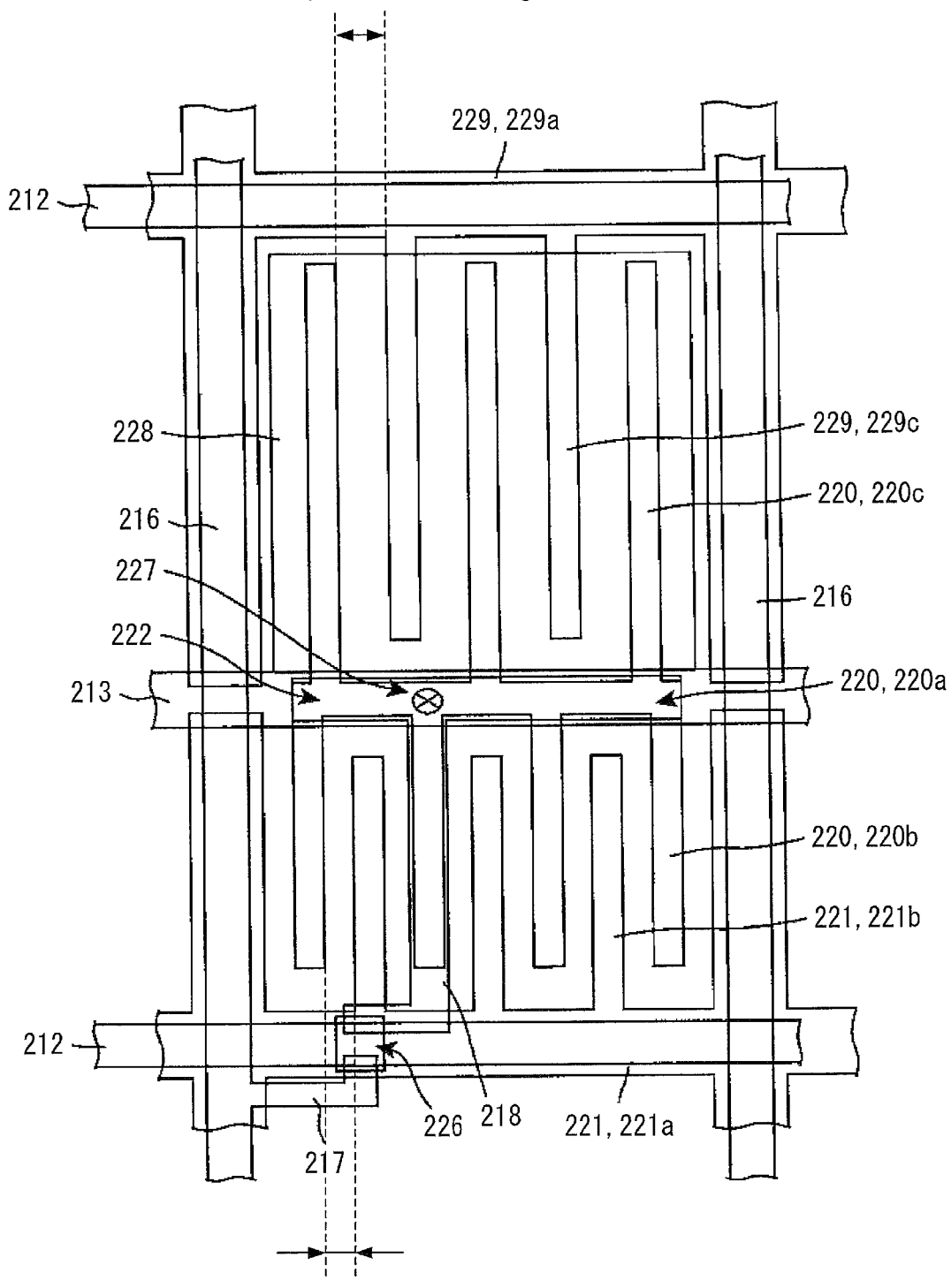
FIG. 21 shows the electrode gap S in the transmissive region T and the electrode gap S in the reflective region R in the TBA mode transflective liquid crystal display panel shown in FIG. 19.

As shown in FIGS. 20(b) and 20(c), spatial distributions in $\Delta n$ are also generated along the X axis direction as described above in a common TBA mode display, but the regions where the electric field is distorted are smaller than the horizontal electric field (fringe field) used in the liquid crystal display panel 2 of the present embodiment, and the orientation of the liquid crystal molecules following the electric field are also horizontally oriented with small distortions.

Accordingly, in a normal TBA mode display, it is not possible to approximate the optical characteristics (voltage-transmission/reflection characteristics) in the transmissive regions and reflective regions by merely configuring the panel gap (thickness of the liquid crystal layer) d, the line width L of the respective linear electrodes that are the branch parts of the comb-shaped electrodes 9, and the gap S between the adjacent linear electrodes to be shared among all the regions, without distinction among the transmissive regions and the reflective regions, as in the liquid crystal display panel 2 of the present embodiment.

The results of using an LCD-MASTER made by Syntech to calculate voltage-transmittance/reflectance curves while changing the panel gap d and the gap S between the adjacent linear electrodes when the line width L of the respective linear electrodes that are the branch parts of the comb-shaped electrodes 9 is set at 4.0 μm will be explained below based on FIGS. 6 to 8.

The reflectance was calculated with the amount of light of a prescribed wavelength in the visible spectrum that enters the liquid crystal layer 17 from the side opposite to where the metal electrode 6 is disposed being 100%, with this light being reflected by the metal electrode 6 and then exiting again from the side opposite to where the metal electrode 6 is disposed through the liquid crystal layer 17. The calculations were performed with the reflectance of the metal electrode 6 being 100%.

The transmittance was calculated with the amount of light of the prescribed wavelength that enters the liquid crystal layer 17 from the side opposite to where the transparent electrode 7 is disposed being 100%, with this light exiting from the side opposite to where the transparent electrode 7 is disposed through the liquid crystal layer 17.

In FIGS. 6(a) to 6(c), voltage-transmittance/reflectance curves are shown where the line width L of the respective linear electrodes that are the branch parts of the comb-shaped electrodes 9 are set at 4.0 μm and the panel gap d is set at 3.4 μm for each calculation, and the gap S between the adjacent linear electrodes is set at 8.0 μm, 12.0 μm, and 16.0 μm, respectively.

In FIGS. 7(a) to 7(c), voltage-transmittance/reflectance curves are shown where the line width L of the respective linear electrodes that are the branch parts of the comb-shaped electrodes 9 are set at 4.0 μm and the panel gap d is set at 3.8 μm for each calculation, and the gap S between the adjacent linear electrodes is set at 8.0 μm, 12.0 μm, and 16.0 μm, respectively.

In FIGS. 8(a) to 8(c), voltage-transmittance/reflectance curves are shown where the line width L of the respective linear electrodes that are the branch parts of the comb-shaped electrodes 9 are set at 4.0 μm and the panel gap d is set at 4.2 μm for each calculation, and the gap S between the adjacent linear electrodes is set at 8.0 μm, 12.0 μm, and 16.0 μm, respectively.

Figure 6:
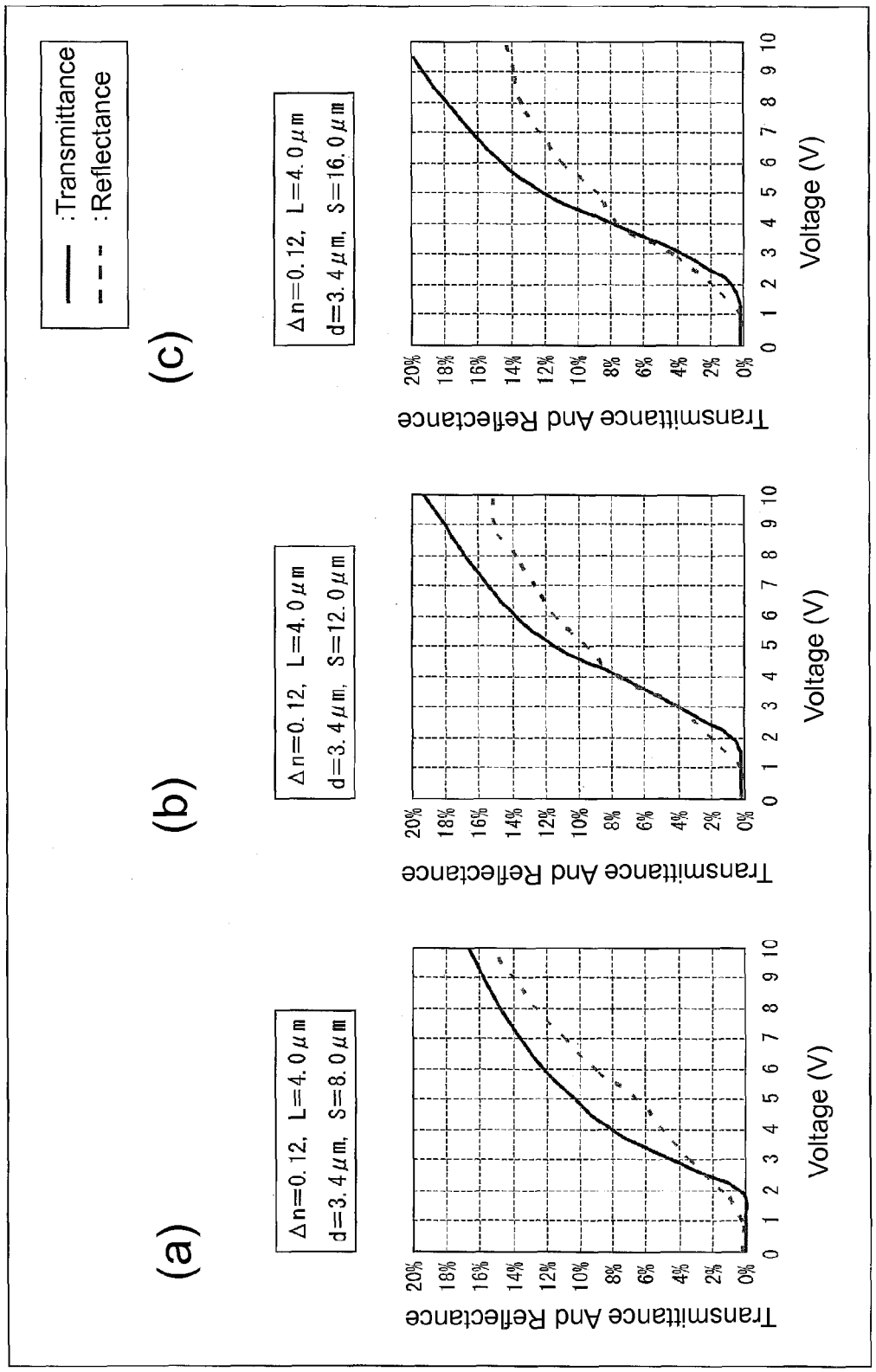
FIG. 6 shows voltage-transmittance/reflectance curves when line widths L of respective linear electrodes, which are the branch parts of the comb-shaped electrodes, are set at 4.0 μm, a panel gap is set at 3.4 μm, and only gaps S between the adjacent linear electrodes are changed to 8.0 μm, 12.0 μm, and 16.0 μm, respectively, in the transflective liquid crystal display panel according to one embodiment of the present invention.
Figure 7:
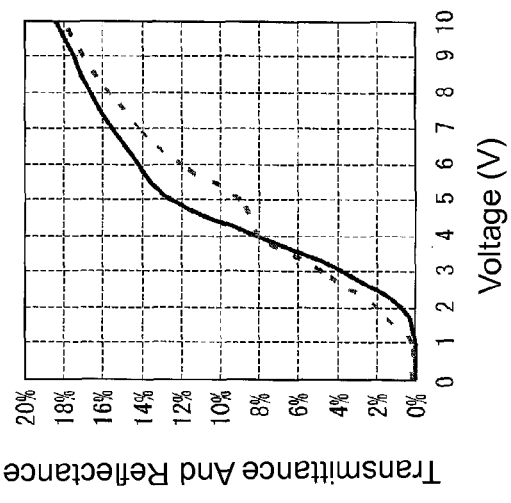
FIG. 7 shows voltage-transmittance/reflectance curves when the line widths L of respective linear electrodes, which are the branch parts of the comb-shaped electrodes, are set at 4.0 μm, the panel gap is set at 3.8 μm, and only the gaps S between the adjacent linear electrodes are changed to 8.0 μm, 12.0 μm, and 16.0 μm, respectively, in the transflective liquid crystal display panel according to one embodiment of the present invention.
Figure 7:
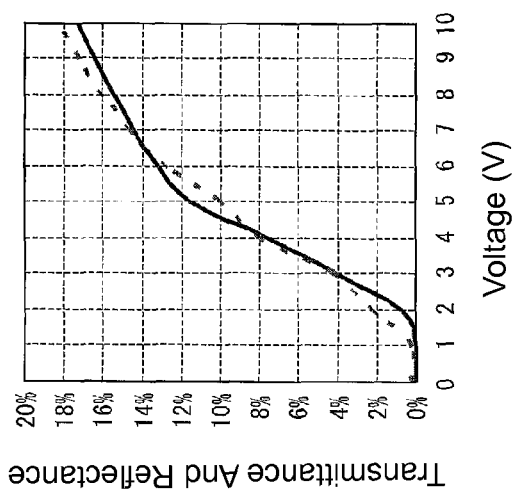
Figure 7:
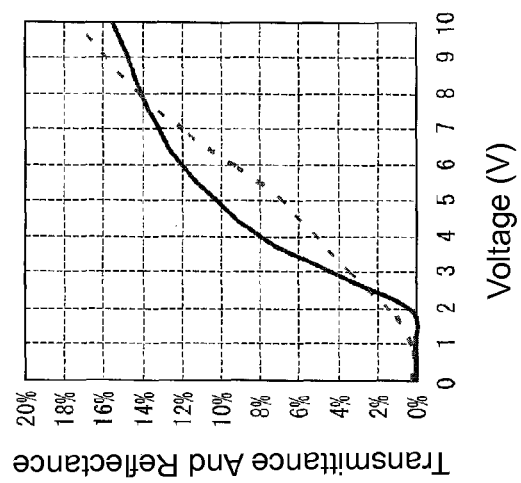
Figure 8:
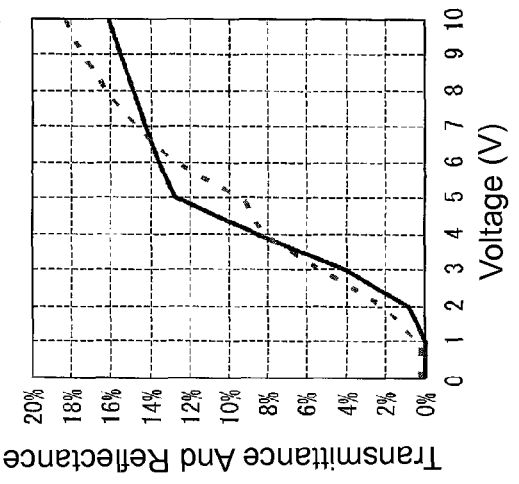
FIG. 8 shows voltage-transmittance/reflectance curves when the line widths L of respective linear electrodes, which are the branch parts of the comb-shaped electrodes, are set at 4.0 μm, the panel gap is set at 4.2 μm, and only the gaps S between the adjacent linear electrodes are changed to 8.0 μm, 12.0 μm, and 16.0 μm, respectively, in the transflective liquid crystal display panel according to one embodiment of the present invention.
Figure 8:
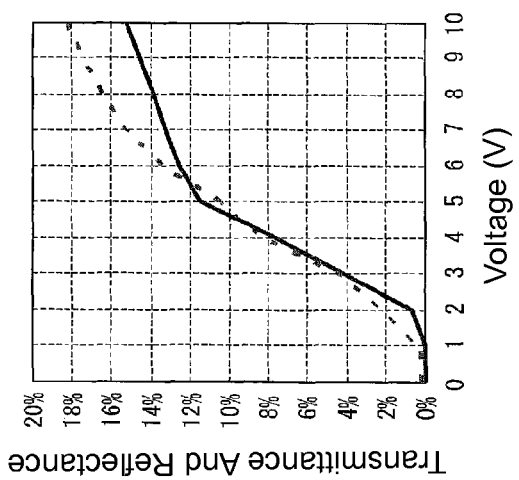
Figure 8:
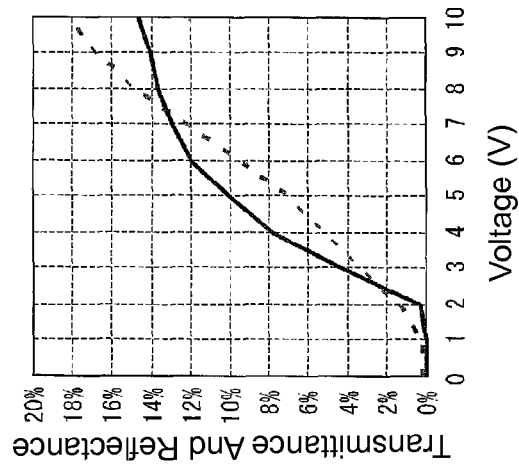
Figure 9:
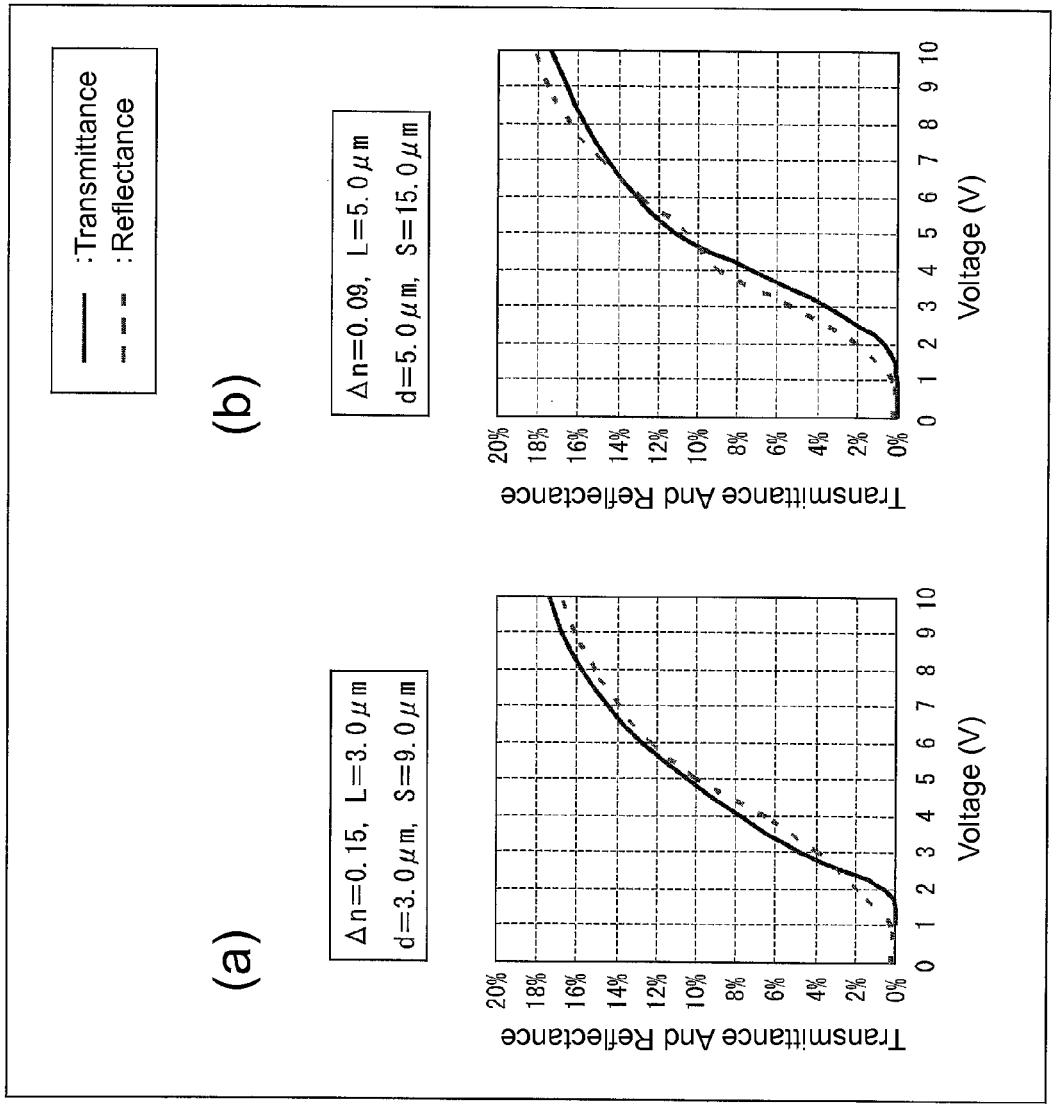
FIG. 9(a) shows voltage-transmittance/reflectance curve calculation results when Δn=0.15, d=3.0 μm, L=3.0 μm, and S=9.0 μm.
FIG. 9(b) shows voltage-transmittance/reflectance curve calculation results when Δn=0.09, d=5.0 μm, L=5.0 μm, and S=15.0 μm.

As can be understood from the calculation results shown in FIGS. 6 to 8, the voltage-transmittance curve and the voltage-reflectance curve most approximate each other in FIG. 7(b), when the line width L of the respective linear electrodes that are the branch parts of the comb-shaped electrodes 9 are set at 4.0 μm, the panel gap d is set at 3.8 μm, and the gap S between the adjacent linear electrodes is set at 12.0 μm.

Based on these calculation results, the inventors of the present invention have predicted that the voltage-transmittance curve and the voltage-reflectance curve can approximate each other even further if the relationship among the birefringence Δn of the liquid crystal layer, the panel gap (thickness of the liquid crystal layer) d, the line width L of the respective linear electrodes that are the branch parts of the comb-shaped electrodes 9, and the gap S between the adjacent linear electrodes are met in Formula (1) and Formula (2) below.

$$\Delta n \times d \approx 450 \text{ nm} \quad \text{Formula (1)}$$

In Formula (1), 450 nm is found by Δn×d=0.12×3800 nm=456 nm.

$$d:L:S \approx 1:1:3 \quad \text{Formula (2)}$$

In Formula (2), 1:1:3 is found by d:L:S=3.8 μm:4.0 μm:12.0 μm.

For verification, the inventors of the present invention calculated the voltage-transmittance/reflectance curves in a manner similar to above for Δn=0.15, d=3.0 μm, L=3.0 μm, S=9.0 μm and Δn=0.09, d=5.0 μm, L=5.0 μm, S=15.0 μm, which suitably fulfill the conditions in Formula (1) and Formula (2).

FIG. 9(a) shows calculation results of voltage-transmittance/reflectance curves when Δn=0.15, d=3.0 μm, L=3.0 μm, S=9.0 μm, and FIG. 9(b) shows calculation results of voltage-transmittance/reflectance curves when Δn=0.09, d=5.0 μm, L=5.0 μm, S=15.0 μm.

As shown in FIGS. 9(a) and 9(b), in both cases the voltage-transmittance curves and the voltage-reflectance curves closely approximated each other, as predicted by the inventors of the present invention.

Accordingly, in the liquid crystal display panel 2 of the present embodiment, it is preferable that the liquid crystal layer 17 and the comb-shaped electrodes 9 be formed such that the product of the birefringence Δn of the liquid crystal layer 17 and the thickness d of the liquid crystal layer 17 is approximately 450 nm, and such that the thickness d of the liquid crystal layer 17, the shortest line width L of the respective linear electrodes that are the branch parts of the comb-shaped electrodes 9, and the gap S between the adjacent linear electrodes fulfill a ratio of 1:1:3. In other words, it is preferable that the liquid crystal display panel 2 of the present embodiment meet the conditions in Formula (1) and Formula (2).

It is calculated below to what extent the voltage-transmittance curve and the voltage-reflectance curve approximate each other if the birefringence Δn of the liquid crystal layer is changed within a given range when the panel gap (thickness of the liquid crystal layer) d, the shortest line width L of the respective linear electrodes that are the branch parts of the comb-shaped electrodes, and the gap S between the adjacent linear electrodes approximately fulfill a ratio of 1:1:3. In other words, the calculation is the allowable range of the product (retardation) of the birefringence Δn of the liquid crystal layer and the thickness d of the liquid crystal layer.

Figure 10:
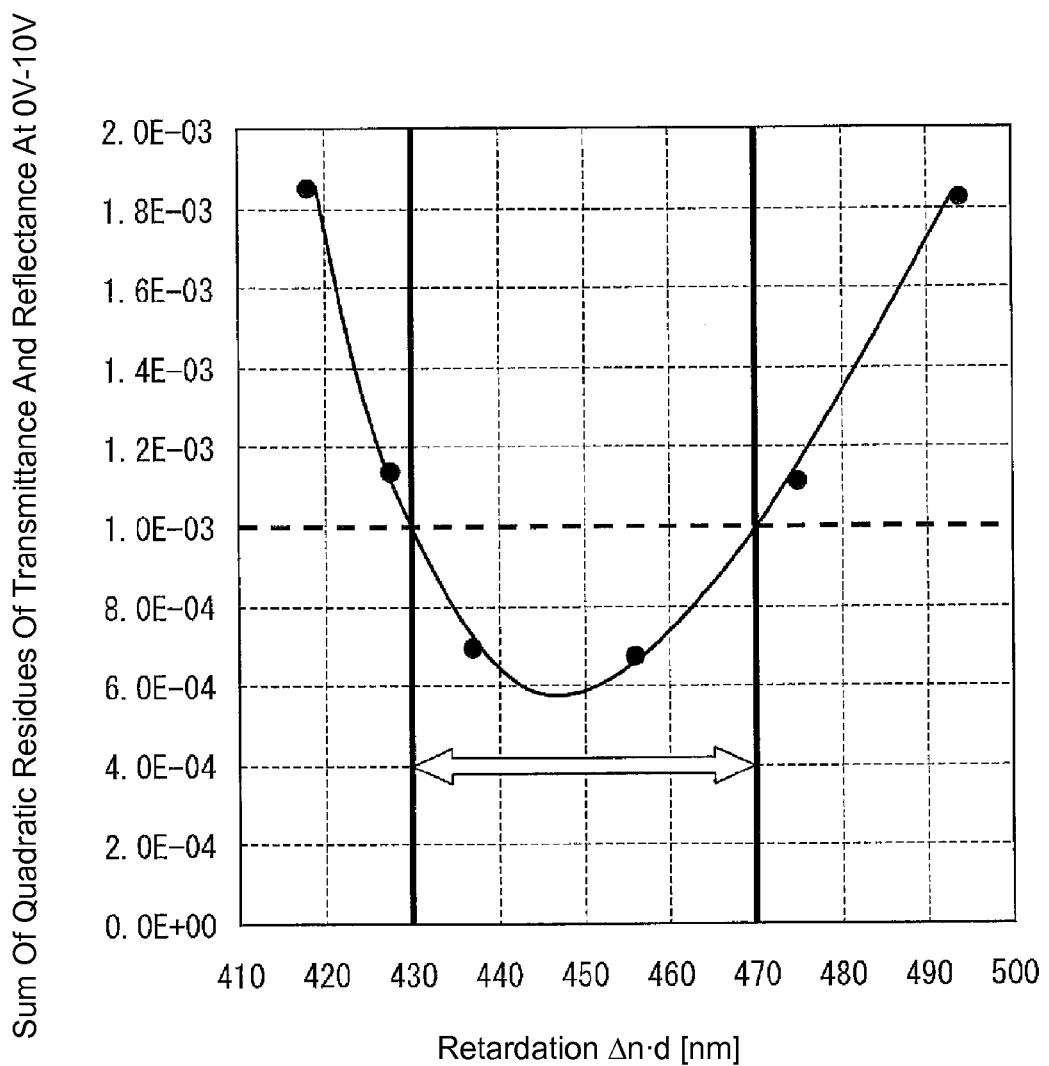
FIG. 10 shows the allowable range of retardation in the transflective liquid crystal display panel of one embodiment of the present invention.

FIG. 10 shows the allowable range of retardation.

To find the allowable range of retardation shown in FIG. 10, the relationship among the panel gap (thickness of the liquid crystal layer) d, the line width L of the respective linear electrodes that are the branch parts of the comb-shaped electrodes 9, and the gap S between adjacent linear electrodes is set at d=3.8 μm, L=4.0 μm, and S=12.0 μm to satisfy Formula (2). The calculations of the transmittance and reflectance were performed while only the birefringence Δn of the liquid crystal layer was changed within a range of 0.11 to 0.13.

Other configurations and physical values that do not particularly disclose these parameters are similar to the transflective liquid crystal display panel 2 shown in FIG. 2.

To find the allowable range of retardation, quadratic residues (transmittance-reflectance)$^2$ are found using respective voltage values between 0V to 10V (0V, 1V, 2V, 3V, 4V, 5V, 6V, 7V, 8V, 9V, and 10V) in order to quantify the degree of approximation between the voltage-transmittance curve and the voltage-reflectance curve. The sum of these is used to find the allowable range.

A smaller quadratic residue sum signifies that the voltage-transmittance curve and the voltage-reflectance curve match each other.

In FIG. 10, the horizontal axis is the value of retardation, and the vertical axis is the sums of the quadratic residues of transmittance and reflectance from 0V to 10V. The graph plots the sum of the quadratic residues at a given value of retardation.

If the sum of the quadratic residues is under 1.0E-03, or namely, $1.0 \times 10^{-3}$, then the voltage-transmittance curve and the voltage-reflectance curve approximate each other, and it can be confirmed that the same display is being provided by transmittance display and reflectance display.

Accordingly, in the graph shown in FIG. 10, when finding the value of retardation when the sum of the quadratic residues is 1.0E-03, or namely, $1.0 \times 10^{-3}$, then as understood by the drawing, this value would be in the range of 430 nm to 470 nm, and the allowable range of retardation would be 450 nm±20 nm.

Thus, it is preferable that the birefringence Δn of the liquid crystal layer be set within a range such that the product (retardation) of the birefringence Δn of the liquid crystal layer and the thickness d of the liquid crystal layer is 450 nm±20 nm, or in other words, 430 nm-470 nm, when the panel gap (thickness of the liquid crystal layer) d, the shortest line width L of the respective linear electrodes that are branch parts of the comb-shaped electrodes, and the gap S between the adjacent linear electrodes satisfy a ratio of approximately 1:1:3.

Figure 11:
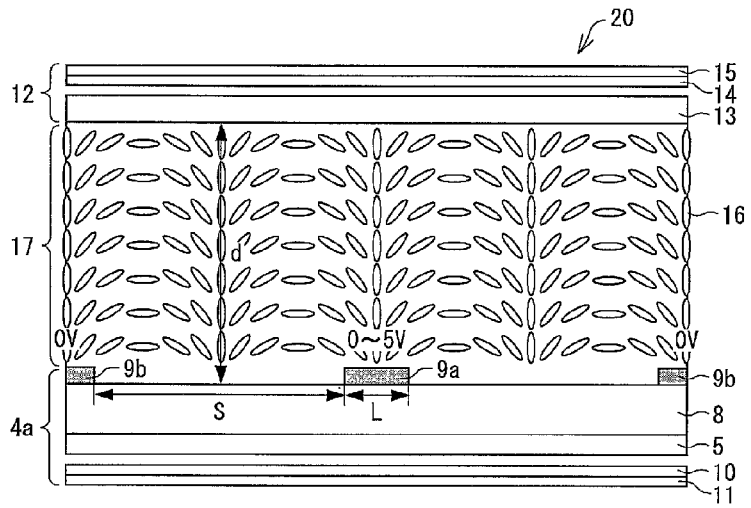
FIG. 11(a) shows Comparison Example 1.
FIG. 11(b) shows calculation results of voltage-transmittance/reflectance curves using Comparison Example 1.
Figure 11:
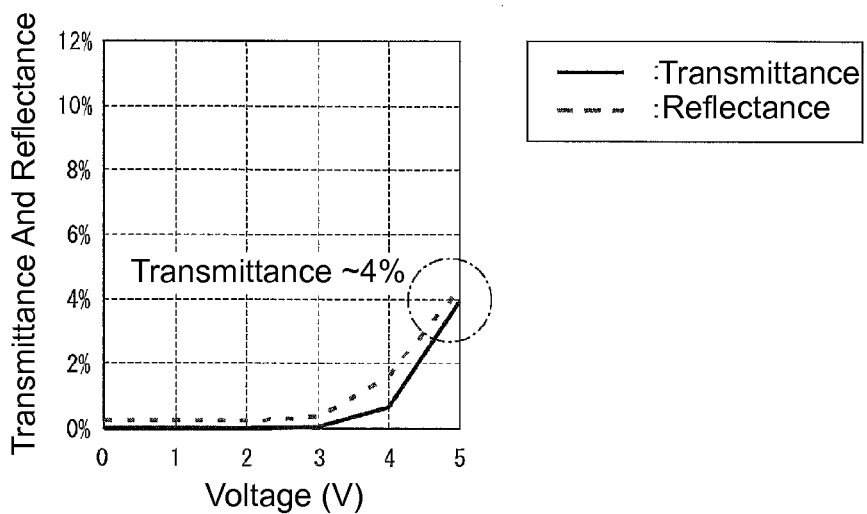
Figure 12:
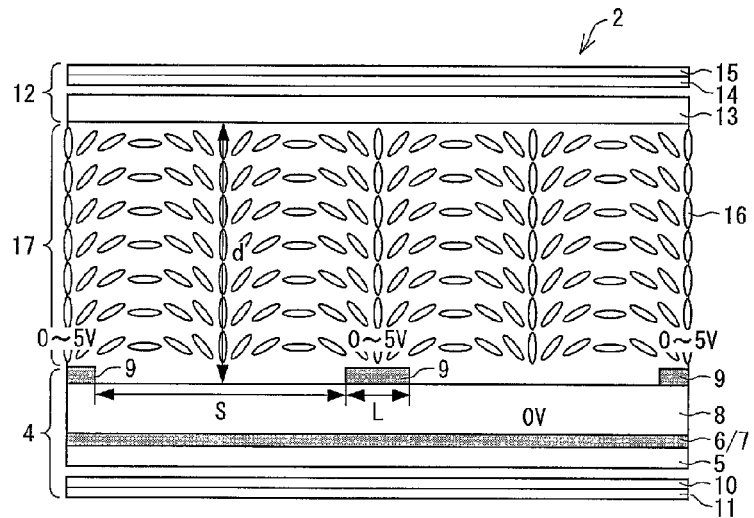
FIG. 12(a) shows a transflective liquid crystal display panel according to one embodiment of the present invention.
FIG. 12(b) shows calculation results of voltage-transmittance/reflectance curves using the transflective liquid crystal display panel according to one embodiment of the present invention.
Figure 12:
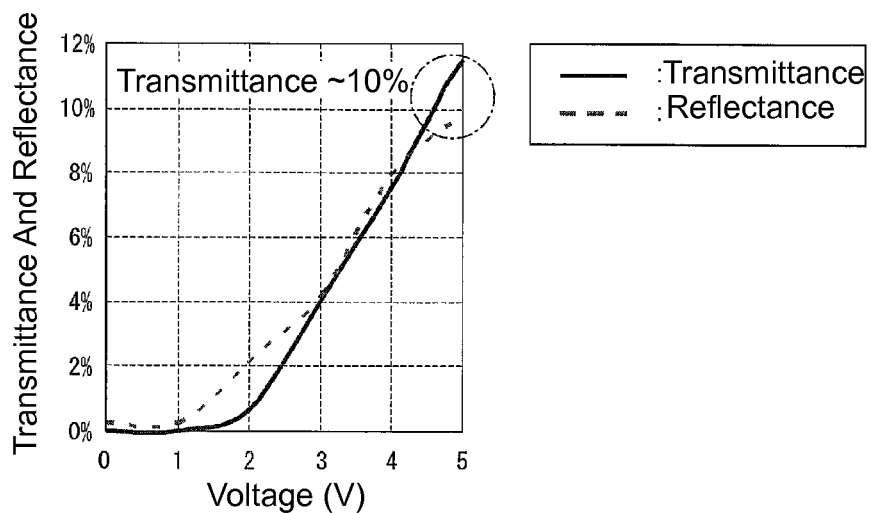

Below, Comparison Example 1 will be explained with reference to FIG. 11.

FIG. 11(a) shows a liquid crystal display panel 20 disclosed in Patent Document 1, which adopts a multi-L/S structure and a TBA structure. FIG. 11(b) shows the calculation results of the voltage-transmittance/reflectance curves using the configuration in FIG. 11(a).

The liquid crystal display panel 20 disclosed in Patent Document 1 satisfies Formula (1) but does not satisfy Formula (2).

On an active matrix substrate 4a disposed on the liquid crystal display panel 20, a branch part 9a of the pixel electrode and branch parts 9b of the common electrode are formed on an interlayer insulating film 8, and there is no metal electrode 6 or transparent electrode 7.

As shown in FIG. 11(b), in the liquid crystal display panel 20, the transmittance and reflectance at 5V is low: approximately 4%.

On the other hand, FIG. 12(a) shows the configuration of the liquid crystal display panel 2 in the present embodiment, and FIG. 12(b) shows the calculation results of the voltage-transmittance/reflectance using the configuration in FIG. 12(a).

The liquid crystal display panel 2 of the present embodiment satisfies Formula (1) and Formula (2).

As shown in FIG. 12(b), in the liquid crystal display panel 2 of the present embodiment, transmittance and reflectance at 5V is approximately 10%, which is high when compared to Comparison Example 1.

Accordingly, the liquid crystal display panel 2 of the present embodiment has a high usage efficiency of light as compared to the liquid crystal display panel 20 (Comparison Example 1) disclosed in Patent Document 1.

Although not shown in FIG. 11(a), in the liquid crystal display panel 20 disclosed in Patent Document 1, it is necessary to separately provide the reflective region with a reflective plate. However, in the liquid crystal display panel 2 of the present embodiment, the metal electrode 6 that has a planar shape doubles as the reflective plate.

In the liquid crystal display panel 20 disclosed in Patent Document 1, the reflective plate disposed in the reflective region is not electrically connected to any electrodes, and thus, if a charge builds up on the reflective plate, there is nowhere for it to go, which makes the display panel with this configuration susceptible to display defects such as screen burn-in.

On the other hand, in the liquid crystal display panel 2 of the present embodiment, the metal electrode 6 that has a planar shape doubles as the reflective plate, and since this reflective plate is, by definition, an electrode, any charge can immediately pass therethrough even if stored temporarily. Therefore, this configuration is not susceptible to screen burn-in.

FIG. 13 shows the results of comparing transmittance (reflectance) at 5V and the degree of screen burn-in between the liquid crystal display panel 2 in the present embodiment and the liquid crystal display panel 20 (Comparison Example 1) disclosed in Patent Document 1.

Figure 14:
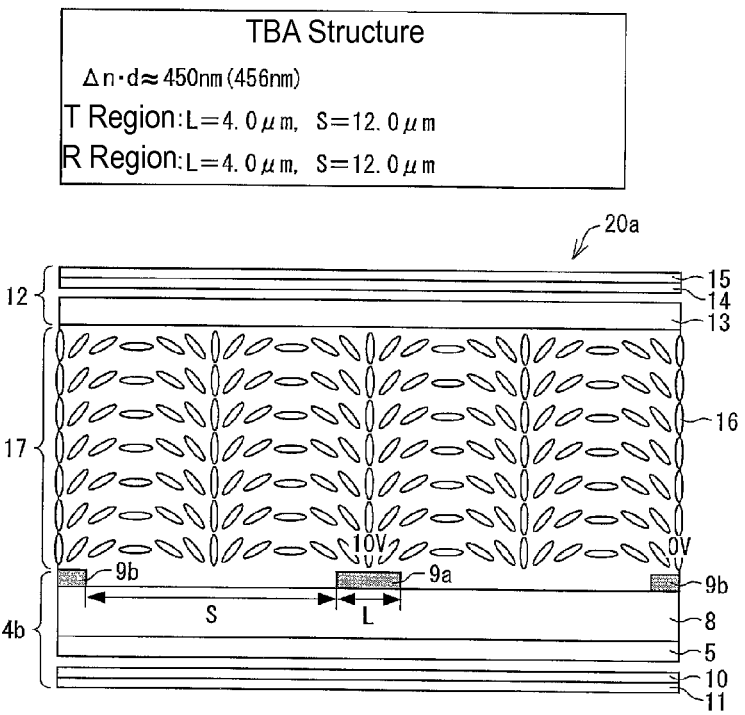
FIG. 14(a) shows Comparison Example 2.
FIG. 14(b) shows calculation results of voltage-transmittance/reflectance curves using Comparison Example 2.
Figure 14:
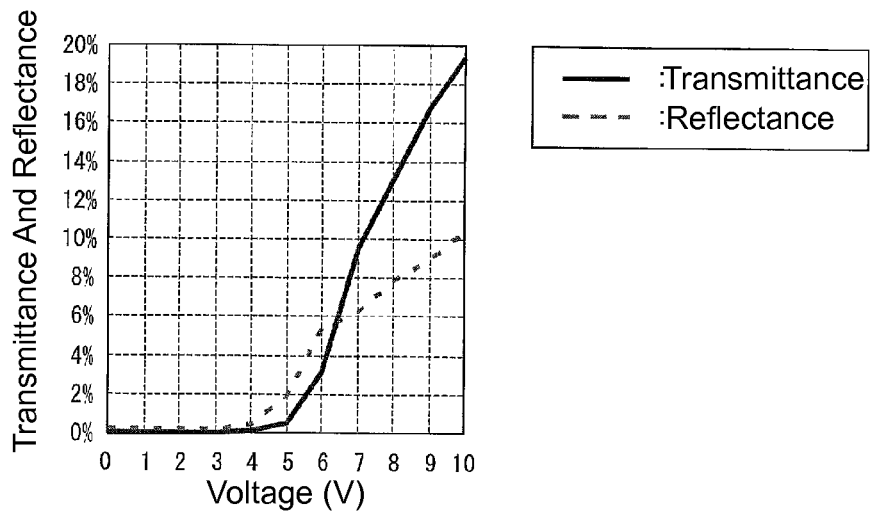

Below, Comparison Example 2 will be explained with reference to FIG. 14.

FIG. 14(a) shows a schematic configuration of a liquid crystal display panel 20a in which only the electrode structure is the same as a normal TBA mode display. In other words, a branch part 9a of the pixel electrode and branch parts 9b of the common electrode are formed on an interlayer insulating film 8, and there is no metal electrode 6 or transparent electrode 7. The branch part 9a of the pixel electrode and the branch parts 9b of the common electrode are formed in both the transmissive region and the reflective region with a line width L of 4.0 μm and a gap S between adjacent electrodes of 12.0 μm.

FIG. 14(b) shows calculation results of voltage-transmittance/reflective curves using the liquid crystal display panel 20a shown in FIG. 14(a).

The configuration is such that the product of the birefringence Δn of a liquid crystal layer 17 and a thickness d of the liquid crystal layer 17 is approximately 450 nm, and such that the thickness d of the liquid crystal layer 17, the line width L of the branch parts 9a of the pixel electrodes and the branch parts 9b of the common electrode, and the gap S between the adjacent branch parts 9a of the pixel electrodes and the branch parts 9b of the common electrode satisfy a 1:1:3 ratio.

However, as shown in FIG. 14(b), the voltage-transmittance curve and voltage-reflectance curve were not quite able to approximate each other.

Therefore, it can be understood that an electrode structure in which a horizontal electric field (fringe field) is generated, such as in the liquid crystal display panel 2 of the present embodiment, is necessary.

Figure 15:
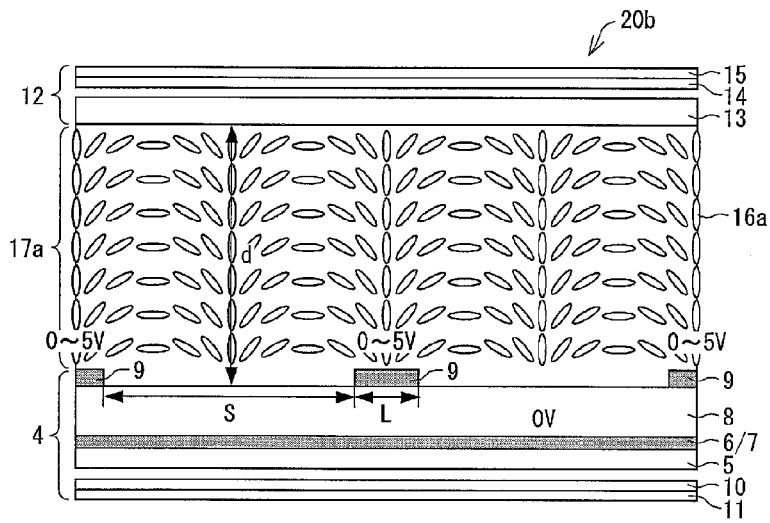
FIG. 15(a) shows Comparison Example 3.
FIG. 15(b) shows calculation results of voltage-transmittance/reflectance curves using Comparison Example 3.
Figure 15:
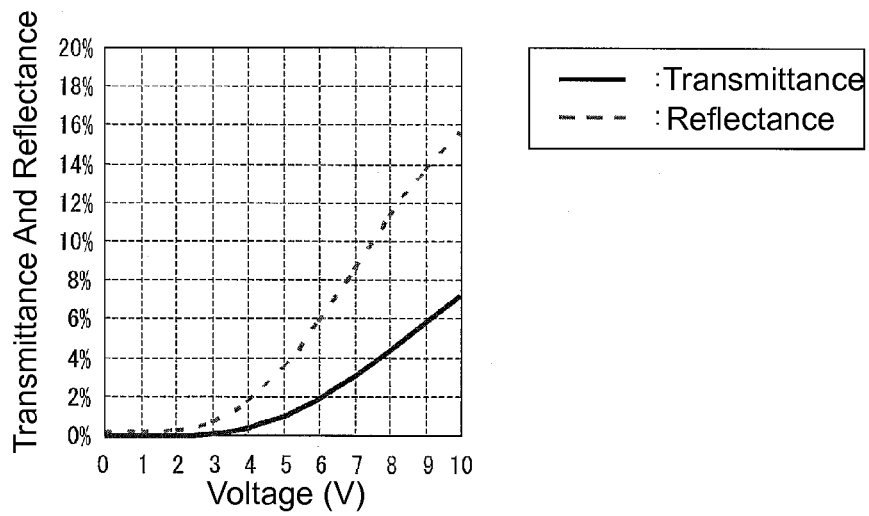

Below, Comparison Example 3 will be explained with reference to FIG. 15.

In a liquid crystal display panel 20b shown in FIG. 15(a), the liquid crystal layer 17 having the liquid crystal molecules 16 with a positive dielectric anisotropy (Δn=0.12, Δ∈=20) has been changed to a liquid crystal layer 17a having liquid crystal molecules 16a with a negative dielectric anisotropy (Δn=0.11, Δ∈=−5.0). The rest is similar to the liquid crystal display panel 2.

FIG. 15(b) shows calculation results of voltage-transmittance/reflective curves using the liquid crystal display panel 20b shown in FIG. 14(b).

However, as shown in FIG. 15(b), the voltage-transmittance curve and voltage-reflectance curve were not quite able to approximate each other.

Therefore, it can be understand that using a liquid crystal layer having liquid crystal molecules with a positive dielectric anisotropy, as in the liquid crystal display panel 2 in the present embodiment, is necessary.

Embodiment 2

Next, Embodiment 2 of the present invention will be described with reference to FIG. 16. Embodiment 2 differs from Embodiment 1 in that the metal electrode 6 and the transparent electrode 7 in Embodiment 1 have no relation to a reflective region or transmissive region, and are instead formed as a transflective electrode 18 in a liquid crystal display panel 2a of the present embodiment. Other configurations are the same as described in Embodiment 1. For ease of description, members that have the same functions as members shown in drawings of Embodiment 1 will be assigned the same reference characters, and descriptions thereof will be omitted.

Figure 16:
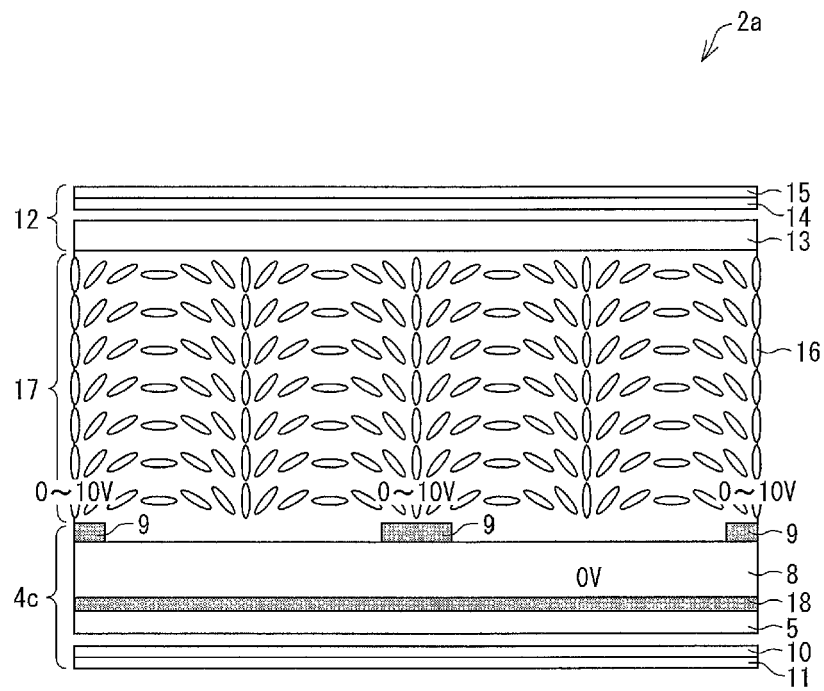
FIG. 16 shows a schematic configuration of a liquid crystal display panel according to another embodiment of the present invention.

FIG. 16 shows a schematic configuration of a liquid crystal display panel 2a.

As shown in the drawing, in the liquid crystal display panel 2a, there is no distinction between reflective region and transmissive region, and instead the transflective electrode 18, which is formed in a planar shape, reflects and allows the passing of light that has entered the panel.

The transflective electrode 18 may be a thin-film constituted of Al, Ag, Au, or the like.

The reflectance and transmittance of the transflective electrode 18 changes depending on the film thickness thereof.

Accordingly, in Embodiment 1 described above, calculations were performed with the reflectance of the metal electrode 6 being 100%, but in the present embodiment, the reflectance of the transflective electrode 18 having a prescribed film thickness may be used when calculating a thickness d of a liquid crystal layer 17, a shortest line width L of the respective linear electrodes that are branch parts of comb-shaped electrodes 9, and a gap S between adjacent linear electrodes so that the average transmittance and average reflectance for each prescribed region can equal or approximate each other.

In the present embodiment, the transflective electrode 18 is formed at a film thickness such that reflectance and transmittance are 1:1, and calculations are performed with the reflectance of the transflective electrode 18 being 50%.

Even if the reflectance of the transflective electrode 18 is 50%, the voltage-transmittance curves and voltage-reflective curves can significantly approximate each other, in a manner similar to Embodiment 1 above, by being configured such that the thickness d of the liquid crystal layer 17, the shortest line width L of the respective linear electrodes that are branch parts of the comb-shaped electrodes 9, and the gap S between the adjacent linear electrodes satisfy a ratio of approximately 1:1:3.

With this configuration, the transflective electrode 18 can be formed in a single step, and thus it is possible to decrease the number of manufacturing steps and to improve the yield of the liquid crystal display panel 2a.

Embodiment 3

Next, Embodiment 3 of the present invention will be described with reference to FIG. 17. Embodiment 3 differs from Embodiment 1 in that a liquid crystal display panel 2b of the present embodiment has the metal electrode 6 of Embodiment 1 formed in a shape with recesses and protrusions. Other configurations are the same as described in Embodiment 1. For ease of description, members that have the same functions as members shown in drawings of Embodiment 1 will be assigned the same reference characters, and descriptions thereof will be omitted.

Figure 17:
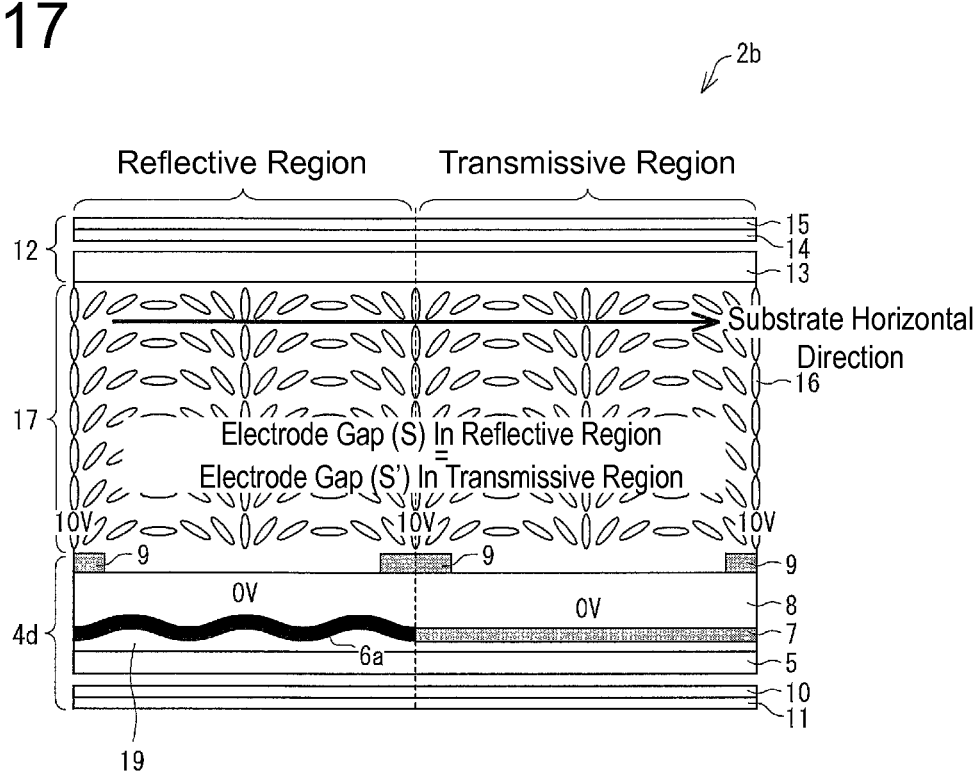
FIG. 17 shows a schematic configuration of a liquid crystal display panel according to another embodiment of the present invention.
Figure 18:
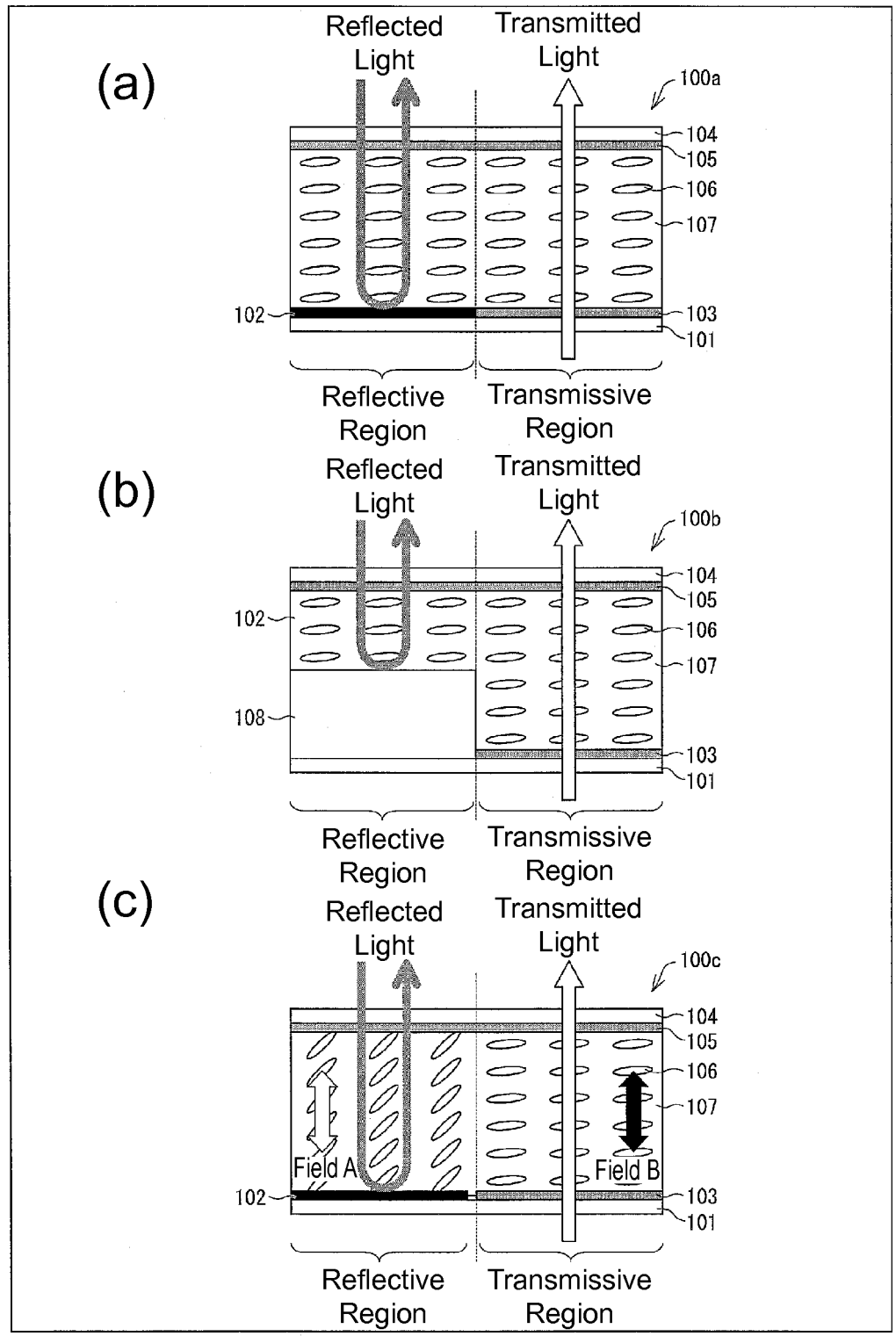
FIG. 18 is a schematic configuration of a conventional transflective liquid crystal display panel.
Figure 19:
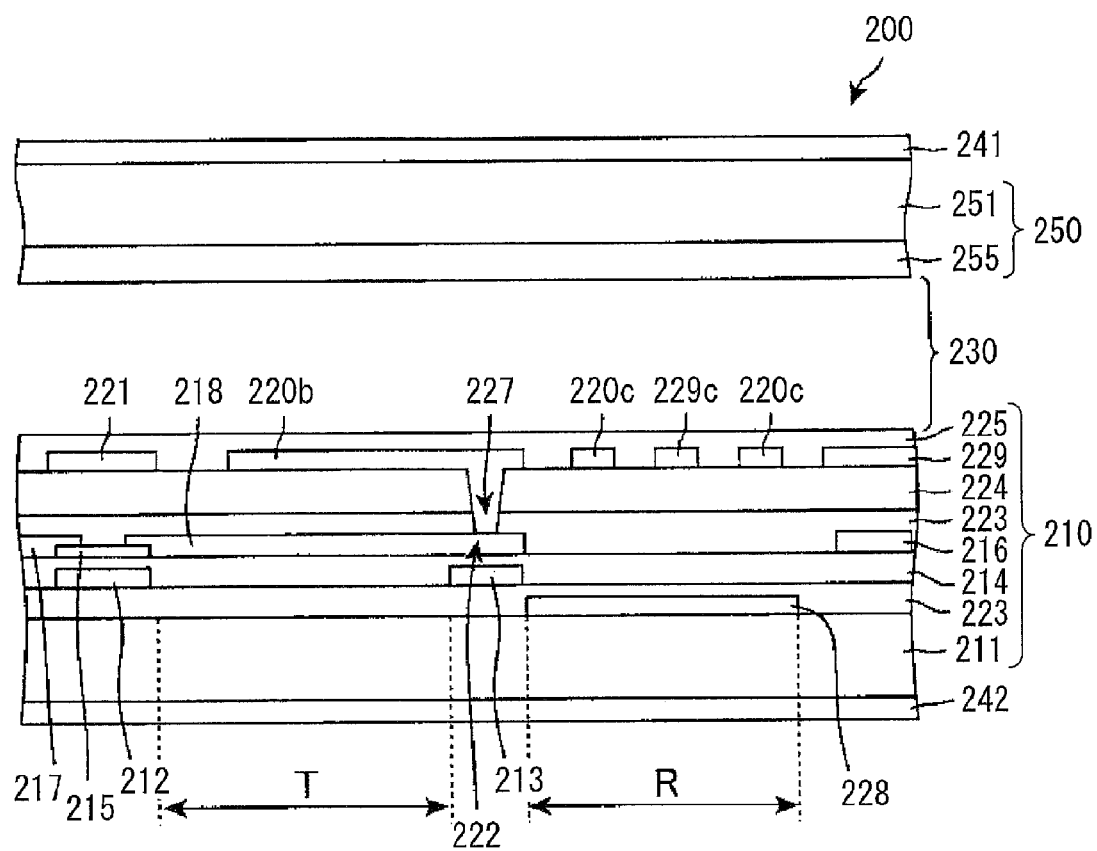
FIG. 19 is a schematic configuration of a TBA mode transflective liquid crystal display panel disclosed in Patent Document 1.

FIG. 17 shows a schematic configuration of the liquid crystal display panel 2b.

As shown in the drawing, an insulating film 19 is formed under a metal electrode 6a and a transparent electrode 7, and a portion of the top of this insulating film 19 (the regions where the metal electrode 6a is formed) has a shape with rounded recesses and protrusions.

In order to form this portion of the top of the insulating film 19, in the present embodiment, an organic film such as an acrylic resin that is transparent and photosensitive is used for the insulating film 19. The film is exposed, developed, and patterned to form the recesses and protrusions. Thereafter, melt flow is performed with a heat treatment to round the shape of these recesses and protrusions.

The metal electrode 6a having slightly rounded recesses and protrusions will be formed on the portion of the top of the insulating film 19 that has recesses and protrusions rounded in this manner; therefore, it is possible to design a configuration such that light is scattered within a constant angle range, and this allows bright reflective characteristics to be achieved by efficiently using ambient light.

Although not shown in the drawing, in Embodiment 2, the entire transflective electrode 18 can be formed with recesses and protrusions by using a similar method.

In the liquid crystal display panel of the present invention, it is preferable that the first electrode be formed as a transflective electrode that both reflects and allows the passing of incident light.

With this configuration, the first electrode can be formed in a single step, thus making it possible to create the number of manufacturing steps and to improve the yield of liquid crystal display panels.

In the liquid crystal display panel of the present invention, each of the pixels has both a reflective region and a transmissive region, and the first electrode formed in the reflective region is made of a material having characteristics that reflect at least visible light, and the first electrode formed in the transmissive region is made of a material having characteristics that allow at least visible light to pass therethrough.

With this configuration, the first electrode in the reflective region is made of a material having characteristics that reflect at least visible light, and the first electrode in the transmissive region is made of a material having characteristics that allow at least visible light to pass therethrough; therefore, it is possible to realize a liquid crystal display panel that has high display quality regardless of the usage environment.

In the liquid crystal display panel of the present invention, it is preferable that the product of the birefringence Δn of the liquid crystal layer and the thickness d of the liquid crystal layer be 430 nm to 470 nm and the ratio of the thickness d of the liquid crystal layer, the shortest line width L of the respective linear electrodes of the second electrode, and the gap S between the adjacent linear electrodes of the second electrode be approximately 1:1:3.

In the liquid crystal display panel of the present invention, it is preferable that the product of the birefringence Δn of the liquid crystal layer and the thickness d of the liquid crystal layer be approximately 450 nm.

With this configuration, it is possible for the transmittance variation curve corresponding to applied voltage in the transmissive region to approximate the reflective variation curve corresponding to applied voltage in the reflective region, which makes it possible to achieve a liquid crystal display panel with a higher display quality.

The expression "approximately 1:1:3" above means that approximately 1 is at least 0.5 but less than 1.5, and approximately 3 is at least 2.5 but less than 3.5.

In the liquid crystal display panel of the present invention, it is preferable that the circularly polarizing light member include polarizing plates and λ/4 plates.

With this configuration, it is possible to provide the circular polarizing plate members on the liquid crystal display panel with comparative ease.

In the liquid crystal display panel of the present invention, it is preferable that the optical axis of the λ/4 plate disposed on the first substrate be at a 45° angle to the transmission axis of the polarizing plate, and that the optical axis of the λ/4 plate disposed on the second substrate be at a 45° angle to the transmission axis of the other polarizing plate. It is preferable that the transmission axis of the polarizing plate disposed on the first substrate be rotated at a 90° angle to the transmission axis of the polarizing plate disposed on the second substrate, and that the optical axis of the λ/4 plate disposed on the first substrate be rotated at a 90° angle to the optical axis of the λ/4 plate disposed on the second substrate.

With this configuration, it is possible to freely manufacture the liquid crystal display panel, regardless of what direction the respective linear electrodes of the second electrode extend towards.

In the liquid crystal display panel of the present invention, the second electrode may have a comb-shape that includes a base part and branch parts electrically connected together, and the plurality of linear electrodes of the second electrodes may be the branch parts.

With this configuration, even when the second electrode has this comb-shape, it is possible to achieve a transflective liquid crystal display panel that has high transmittance, reflectance, and yield, and that can suppress display defects such as screen burn-in without using a panel gap adjusting structure, driving method that respectively applies different electric fields to the reflective region and the transmissive region, or a multi-L/S structure.

In the liquid crystal display panel of the present invention, it is preferable that the first electrode have recesses and protrusions.

In the liquid crystal display panel of the present invention, it is preferable that the first electrode formed in the reflective region have recesses and protrusions.

With this configuration, the first electrode used for reflectance has recesses and protrusions, thus making it possible to design a configuration that scatters light within a constant angle range and that can obtain bright reflective characteristics by efficiently using ambient light.

The present invention is not limited to the embodiment described above, and various modifications can be made without departing from the scope of the claims. Therefore, embodiments obtained by appropriately combining the techniques disclosed in different embodiments are included in the technical scope of the present invention.

INDUSTRIAL APPLICABILITY

The present invention is applicable to a liquid crystal display panel and a liquid crystal display device having this liquid crystal display panel.

DESCRIPTION OF REFERENCE CHARACTERS 1 liquid crystal display device
2, 2a, 2b liquid crystal display panel
3 backlight
4 active matrix substrate
5, 13 insulating substrate
6 metal electrode (first electrode)
7 transparent electrode (third electrode)
8 interlayer insulating film (insulating film)
9 comb-shaped electrode (second electrode)
10, 14 λ/4 plate
11, 15 linear polarizing plate
12 opposite substrate
16 liquid crystal molecules
17 liquid crystal layer
18 transflective electrode
19 insulating film
d panel gap (thickness of liquid crystal layer)
L line width of linear electrodes of comb-shaped electrode
S gap between adjacent linear electrodes of comb-shaped electrode
Δn birefringence

What is claimed is:

1. A liquid crystal display panel having a plurality of pixels that performs display by light reflection and light transmission at each of the plurality of pixels, the liquid crystal display panel comprising:
   a first substrate;
   a second substrate;
   a liquid crystal layer having liquid crystal molecules sandwiched between the first substrate and the second substrate, the liquid crystal molecules having a positive birefringence and, when no voltage is applied, being oriented perpendicularly to respective surfaces of the first substrate and the second substrate in contact with the liquid crystal layer;
   circularly polarizing members respectively disposed on the first substrate and the second substrate;
   a first electrode formed in a planar shape on the first substrate at each of the plurality of pixels,
   an insulating film formed on the first electrode; and
   a second electrode having a plurality of linear electrodes that are formed at constant intervals and constant line widths on the insulating film so as to overlap the first electrode in a plan view at each of the plurality of pixels,
   wherein the product of a birefringence Δn of the liquid crystal layer and a thickness of the liquid crystal layer is 430 nm to 470 nm, and
   wherein the thickness of the liquid crystal layer, a shortest line width of the respective linear electrodes of the second electrode, and a gap between the respective linear electrodes of the second electrode satisfy a ratio of approximately 1:1:3.

2. The liquid crystal display panel according to claim 1, wherein the first electrode is a transflective electrode that reflects light and allows light to pass therethrough.

3. The liquid crystal display panel according to claim 1, further comprising:
a third electrode formed in a planar shape on the first substrate at each of the plurality of pixels, the second electrode overlapping the third electrode in a plan view,
wherein each of the plurality of pixels has a reflective region and a transmissive region,
wherein the first electrode is formed in the reflective region and made of a material that reflects at least visible light, and
wherein the third electrode is formed in the transmissive region and made of a material that allows at least visible light to pass therethrough.

4. The liquid crystal display panel according to claim 1, wherein the product of the birefringence $\Delta n$ and the thickness of the liquid crystal layer is approximately 450 nm.

5. The liquid crystal display panel according to claim 1, wherein the circularly polarizing members are each constituted of a polarizing plate and a $\lambda/4$ plate.

6. The liquid crystal display panel according to claim 5, wherein an optical axis of the $\lambda/4$ plate disposed on the first substrate is at a 45° angle to a transmission axis of the polarizing plate disposed on the first substrate, and an optical axis of the $\lambda/4$ plate disposed on the second substrate is at a 45° angle to a transmission axis of the polarizing plate disposed on the second substrate,
wherein the transmission axis of the polarizing plate disposed on the first substrate is rotated at a 90° angle to the transmission axis of the polarizing plate disposed on the second substrate, and
wherein the optical axis of the $\lambda/4$ plate disposed on the first substrate is rotated at a 90° angle to the optical axis of the $\lambda/4$ plate disposed on the second substrate.

7. The liquid crystal display panel according to claim 1, wherein the second electrode has a comb-shape that has a base part and branch parts, said base part and said branch parts being electrically connected, and
wherein the plurality of linear electrodes of the second electrode are said branch parts.

8. The liquid crystal display panel according to claim 2, wherein the first electrode has recesses and protrusions.

9. The liquid crystal display panel according to claim 3, wherein the first electrode in the reflective region has recesses and protrusions.

10. A liquid crystal display device, comprising:
the liquid crystal display panel according to claim 1; and
a backlight.

11. The liquid crystal display panel according to claim 2, wherein the product of the birefringence $\Delta n$ and the thickness of the liquid crystal layer is approximately 450 nm.

12. The liquid crystal display panel according to claim 3, wherein the product of the birefringence $\Delta n$ and the thickness of the liquid crystal layer is approximately 450 nm.

* * * * *